(12) United States Patent  (10) Patent No.: US 7,881,208 B1
Nosella et al.  (45) Date of Patent: Feb. 1, 2011

(54) GATEWAY LOAD BALANCING PROTOCOL

(75) Inventors: Thomas J. Nosella, Sunnyvale, CA (US); Ian Herbert Wilson, Midlothian (GB)

(73) Assignee: Cisco Technology, Inc., San Jose, CA (US)

( * ) Notice: Subject to any disclaimer, the term of this patent is extended or adjusted under 35 U.S.C. 154(b) by 1020 days.

(21) Appl. No.: 09/883,674

(22) Filed: Jun. 18, 2001

(51) Int. Cl.
*G01R 31/08* (2006.01)

(52) U.S. Cl. .................. 370/242; 370/401; 370/220; 370/245; 709/105

(58) Field of Classification Search ............. 370/400, 370/401, 389, 392, 216–217, 242, 466; 709/105, 709/230, 238, 239
See application file for complete search history.

(56) References Cited

U.S. PATENT DOCUMENTS

| | | |
|---|---|---|
| 4,692,918 A | 9/1987 | Elliott et al. |
| 4,827,411 A | 5/1989 | Arrowood et al. |
| 4,965,772 A | 10/1990 | Daniel et al. |
| 5,016,244 A | 5/1991 | Massey, Jr. et al. |
| 5,018,133 A | 5/1991 | Tsukakoshi et al. |
| 5,218,600 A | 6/1993 | Schenkyr et al. |
| 5,315,592 A | 5/1994 | Conant et al. |
| 5,371,852 A | 12/1994 | Attanasio et al. |
| 5,414,704 A | 5/1995 | Spinney |
| 5,423,002 A | 6/1995 | Hart |
| 5,452,447 A | 9/1995 | Nelson et al. |
| 5,473,599 A * | 12/1995 | Li et al. ............. 370/219 |
| 5,488,412 A | 1/1996 | Majeti et al. |
| 5,506,987 A | 4/1996 | Abramson et al. |
| 5,511,208 A | 4/1996 | Boyles et al. |
| 5,515,429 A | 5/1996 | Kawada et al. |

(Continued)

FOREIGN PATENT DOCUMENTS

WO  95/29544  11/1995

(Continued)

OTHER PUBLICATIONS

Eager et al., "Adaptive Load Sharing in Homogeneous Distributed Systems," IEEE, Transactions on Software Engineering, vol. Se-12, No. 5, May 1986, pp. 662-675.

(Continued)

*Primary Examiner*—Duc C Ho
(74) *Attorney, Agent, or Firm*—Weaver Austin Villeneuve & Sampson LLP

(57) ABSTRACT

Gateway load balancing and failover methods, apparatus and systems use more than one gateway device in a gateway device group for communications directed outside of a LAN. In the load balancing arrangement, hosts that send ARP messages to a shared virtual IP address receive replies from one of the gateway devices in the gateway device group, directing the host to address outgoing communications to a virtual MAC address assigned to one of the gateway devices. Hosts are assigned virtual MAC addresses for the gateway devices according to a prescribed algorithm or methodology. In the event that one member of the gateway device group fails, the outgoing communications that would have been handled by the failed gateway device are re-assigned to another member of the gateway device group. A master gateway device controls address assignment and failover features. In the event that the master fails, additional steps are taken to appoint or elect a new master and ensure continuity in the load balancing function.

44 Claims, 12 Drawing Sheets

GLB Service conditional response mechanism

U.S. PATENT DOCUMENTS

| | | |
|---|---|---|
| 5,541,911 A | 7/1996 | Nilakantan et al. |
| 5,544,320 A | 8/1996 | Konrad |
| 5,555,244 A | 9/1996 | Gupta et al. |
| 5,572,528 A | 11/1996 | Shuen |
| 5,586,121 A | 12/1996 | Moura et al. |
| 5,611,049 A | 3/1997 | Pitts et al. |
| 5,619,552 A | 4/1997 | Karppanen et al. |
| 5,644,713 A | 7/1997 | Makishima |
| 5,644,720 A | 7/1997 | Boll et al. |
| 5,673,265 A | 9/1997 | Gupta et al. |
| 5,729,537 A | 3/1998 | Billstrom |
| RE35,774 E | 4/1998 | Moura et al. |
| 5,740,375 A | 4/1998 | Dunne et al. |
| 5,751,971 A | 5/1998 | Dobbins et al. |
| 5,774,660 A | 6/1998 | Brendel et al. |
| 5,787,470 A | 7/1998 | DiSimone et al. |
| 5,793,763 A | 8/1998 | Mayes et al. |
| 5,818,845 A | 10/1998 | Moura et al. |
| 5,825,759 A | 10/1998 | Liu |
| 5,828,655 A | 10/1998 | Moura et al. |
| 5,835,696 A | 11/1998 | Hess |
| 5,848,241 A | 12/1998 | Misinai et al. |
| 5,852,717 A | 12/1998 | Bhide et al. |
| 5,859,852 A | 1/1999 | Moura et al. |
| 5,862,345 A | 1/1999 | Okanoue et al. |
| 5,862,451 A | 1/1999 | Grau et al. |
| 5,872,773 A | 2/1999 | Katzela et al. |
| 5,892,903 A | 4/1999 | Klaus |
| 5,940,596 A | 8/1999 | Rajan et al. |
| 5,943,604 A | 8/1999 | Chen et al. |
| 5,946,047 A | 8/1999 | Levan |
| 5,946,048 A | 8/1999 | Levan |
| 5,949,753 A | 9/1999 | Alexander et al. |
| 5,950,205 A | 9/1999 | Aviani, Jr. |
| 5,953,335 A | 9/1999 | Erimli et al. |
| 5,956,346 A | 9/1999 | Levan |
| 5,959,660 A | 9/1999 | Levan |
| 5,959,968 A | 9/1999 | Chin et al. |
| 5,959,997 A | 9/1999 | Moura et al. |
| 6,227,785 B1 | 9/1999 | Kanekar et al. |
| 5,963,540 A | 10/1999 | Bhaskaran |
| 5,982,745 A | 11/1999 | Wolff et al. |
| 5,989,060 A | 11/1999 | Coile et al. |
| 5,996,016 A | 11/1999 | Thalheimer et al. |
| 5,996,021 A | 11/1999 | Civaniar et al. |
| 5,999,536 A | 12/1999 | Kawafuji et al. |
| 6,006,264 A | 12/1999 | Colby et al. |
| 6,006,266 A | 12/1999 | Murphy et al. |
| 6,016,388 A | 1/2000 | Dillon |
| 6,052,718 A | 4/2000 | Gifford |
| 6,058,425 A | 5/2000 | White |
| 6,061,650 A | 5/2000 | Malkin et al. |
| 6,065,061 A | 5/2000 | Blahut et al. |
| 6,073,168 A | 6/2000 | Mighdoll et al. |
| 6,078,575 A | 6/2000 | Dommety et al. |
| 6,088,721 A | 7/2000 | Lin et al. |
| 6,092,178 A | 7/2000 | Jindal et al. |
| 6,097,882 A | 8/2000 | Mogul |
| 6,108,300 A | 8/2000 | Coile et al. |
| 6,111,675 A | 8/2000 | Mao et al. |
| 6,128,666 A | 10/2000 | Muller et al. |
| 6,131,121 A | 10/2000 | Mattaway et al. |
| 6,148,000 A | 11/2000 | Feldman et al. |
| 6,148,410 A | 11/2000 | Baskey et al. |
| 6,157,965 A | 12/2000 | Mohammed et al. |
| 6,167,438 A | 12/2000 | Yates et al. |
| 6,167,446 A | 12/2000 | Lister et al. |
| 6,173,312 B1 | 1/2001 | Atarashi et al. |
| 6,178,455 B1 | 1/2001 | Schutte et al. |
| 6,182,139 B1 | 1/2001 | Brendel |
| 6,189,043 B1 | 2/2001 | Buyukkoc et al. |
| 6,189,102 B1 | 2/2001 | Beser |
| 6,195,689 B1 | 2/2001 | Bahlmann |
| 6,195,705 B1 | 2/2001 | Leung |
| 6,202,169 B1 | 3/2001 | Razzaghe-Ashrafi |
| 6,205,481 B1 | 3/2001 | Heddaya et al. |
| 6,230,196 B1 | 5/2001 | Guenthner et al. |
| 6,230,326 B1 | 5/2001 | Unger et al. |
| 6,236,678 B1 | 5/2001 | Horton et al. |
| 6,240,089 B1 | 5/2001 | Okanoue et al. |
| 6,240,461 B1 | 5/2001 | Cieslak et al. |
| 6,243,360 B1 | 6/2001 | Basilico |
| 6,243,760 B1 | 6/2001 | Armbruster et al. |
| 6,247,054 B1 | 6/2001 | Malkin |
| 6,249,820 B1 | 6/2001 | Dobbins et al. |
| 6,253,234 B1 | 6/2001 | Hunt et al. |
| 6,260,070 B1 | 7/2001 | Shah et al. |
| 6,286,038 B1 | 9/2001 | Reichmeyer et al. |
| 6,286,084 B1 | 9/2001 | Wexler et al. |
| 6,292,832 B1 | 9/2001 | Shah et al. |
| 6,295,276 B1 | 9/2001 | Datta et al. |
| 6,298,063 B1 | 10/2001 | Coile et al. |
| 6,298,381 B1 | 10/2001 | Shah et al. |
| 6,301,223 B1 | 10/2001 | Hrastar et al. |
| 6,324,564 B1 | 11/2001 | Thieke et al. |
| 6,327,622 B1 | 12/2001 | Jindal et al. |
| 6,330,602 B1 | 12/2001 | Law et al. |
| 6,330,606 B1 | 12/2001 | Logue et al. |
| 6,339,830 B1 | 1/2002 | See et al. |
| 6,345,294 B1 | 2/2002 | O'Toole et al. |
| 6,370,147 B1 | 4/2002 | Beser |
| 6,377,972 B1 | 4/2002 | Guo et al. |
| 6,385,204 B1 | 5/2002 | Hoefelmeyer et al. |
| 6,389,027 B1 | 5/2002 | Lee et al. |
| 6,389,462 B1 | 5/2002 | Cohen et al. |
| 6,397,260 B1 * | 5/2002 | Wils et al. .................. 709/238 |
| 6,415,323 B1 | 7/2002 | McCanne et al. |
| 6,434,608 B1 | 8/2002 | Desai |
| 6,438,123 B1 | 8/2002 | Chapman |
| 6,438,652 B1 | 8/2002 | Jordan et al. |
| 6,442,558 B1 | 8/2002 | Brown et al. |
| 6,446,121 B1 | 9/2002 | Shah et al. |
| 6,449,249 B1 | 9/2002 | Cloonan et al. |
| 6,449,250 B1 | 9/2002 | Otani et al. |
| 6,463,475 B1 | 10/2002 | Calhoun |
| 6,466,964 B1 | 10/2002 | Leung et al. |
| 6,470,027 B1 | 10/2002 | Birrell, Jr. |
| 6,470,389 B1 | 10/2002 | Chung et al. |
| 6,473,802 B2 | 10/2002 | Masters |
| 6,477,197 B1 | 11/2002 | Unger |
| 6,477,522 B1 | 11/2002 | Young |
| 6,480,469 B1 | 11/2002 | Moore et al. |
| 6,487,591 B1 | 11/2002 | Budhraja et al. |
| 6,487,605 B1 | 11/2002 | Leung ....................... 709/245 |
| 6,493,318 B1 | 12/2002 | Bare |
| 6,499,088 B1 | 12/2002 | Wexler et al. |
| 6,510,162 B1 | 1/2003 | Fijolek et al. |
| 6,510,469 B1 | 1/2003 | Starnes et al. |
| 6,512,774 B1 * | 1/2003 | Vepa et al. .................. 370/401 |
| 6,519,646 B1 | 2/2003 | Gupta et al. |
| 6,532,493 B1 | 3/2003 | Aviani et al. |
| 6,553,568 B1 | 4/2003 | Fijolek et al. |
| 6,556,591 B2 | 4/2003 | Bernath et al. |
| 6,577,642 B1 | 6/2003 | Fijolek et al. |
| 6,578,066 B1 | 6/2003 | Logan et al. |
| 6,578,077 B1 | 6/2003 | Rakoshitz et al. |
| 6,588,016 B1 | 7/2003 | Chen et al. |
| 6,594,305 B1 | 7/2003 | Roeck et al. |
| 6,598,232 B1 | 7/2003 | McAlear |
| 6,606,315 B1 | 8/2003 | Albert et al. |
| 6,606,352 B2 | 8/2003 | Horton et al. |
| 6,611,868 B1 | 8/2003 | Arutyunov |
| 6,621,810 B1 | 9/2003 | Leung |
| 6,633,585 B1 | 10/2003 | Ghanwani et al. |

| | | | |
|---|---|---|---|
| 6,636,498 B1 | 10/2003 | Leung | |
| 6,636,971 B1 | 10/2003 | Loukianov | |
| 6,650,624 B1 | 11/2003 | Quigley et al. | |
| 6,650,641 B1 | 11/2003 | Albert | |
| 6,665,304 B2 | 12/2003 | Beck et al. | |
| 6,671,259 B1 | 12/2003 | He et al. | |
| 6,674,713 B1 | 1/2004 | Berg et al. | |
| 6,683,873 B1 | 1/2004 | Kwok et al. | |
| 6,687,217 B1 | 2/2004 | Chow et al. | |
| 6,691,165 B1 | 2/2004 | Bruck et al. | |
| 6,724,724 B1 | 4/2004 | Swenson et al. | |
| 6,728,748 B1 | 4/2004 | Mangipudi et al. | |
| 6,735,631 B1 | 5/2004 | Oehrke et al. | |
| 6,742,044 B1 | 5/2004 | Aviani et al. | |
| 6,760,302 B1 | 7/2004 | Ellinas et al. | |
| 6,760,316 B1 | 7/2004 | Hebsgaard et al. | |
| 6,765,892 B1 | 7/2004 | Leung et al. | |
| 6,768,743 B1 | 7/2004 | Borella et al. | |
| 6,779,039 B1 * | 8/2004 | Bommareddy et al. | 709/238 |
| 6,789,125 B1 | 9/2004 | Aviani et al. | |
| 6,795,857 B1 | 9/2004 | Leung et al. | |
| 6,795,860 B1 | 9/2004 | Shah et al. | |
| 6,801,949 B1 * | 10/2004 | Bruck et al. | 709/232 |
| 6,804,221 B1 | 10/2004 | Magret et al. | |
| 6,826,599 B1 | 11/2004 | Shaffer et al. | |
| 6,832,252 B1 | 12/2004 | Cieslak et al. | |
| 6,835,696 B2 | 12/2004 | Saito et al. | |
| 6,839,809 B1 | 1/2005 | Forster et al. | |
| 6,857,026 B1 | 2/2005 | Cain | |
| 6,920,498 B1 | 7/2005 | Gourlay et al. | |
| 6,952,401 B1 | 10/2005 | Kadambi et al. | |
| 6,981,056 B1 | 12/2005 | Aviani et al. | |
| 7,006,431 B1 | 2/2006 | Kanekar et al. | |
| 7,039,720 B2 | 5/2006 | Alfieri et al. | |
| 7,062,570 B2 | 6/2006 | Hong et al. | |
| 7,065,043 B2 | 6/2006 | Wu et al. | |
| 7,072,979 B1 | 7/2006 | Aviani et al. | |
| 7,111,061 B2 | 9/2006 | Leighton et al. | |
| 7,117,273 B1 | 10/2006 | O'Toole et al. | |
| 7,136,383 B1 | 11/2006 | Wilson | |
| 7,143,195 B2 | 11/2006 | Vange et al. | |
| 7,149,217 B2 | 12/2006 | Alexander et al. | |
| 7,151,758 B2 | 12/2006 | Kumaki et al. | |
| 7,162,540 B2 | 1/2007 | Jasen et al. | |
| 7,260,102 B2 | 8/2007 | Mehrvar et al. | |
| 7,349,979 B1 | 3/2008 | Cieslak et al. | |
| 7,395,348 B1 | 7/2008 | Cieslak et al. | |
| 7,401,159 B1 | 7/2008 | Aviani et al. | |
| 7,593,346 B2 | 9/2009 | McLaggan et al. | |
| 7,734,816 B2 | 6/2010 | Cieslak et al. | |
| 2001/0014097 A1 | 8/2001 | Beck et al. | |
| 2001/0042105 A1 | 11/2001 | Koehler et al. | |
| 2001/0049741 A1 | 12/2001 | Skene et al. | |
| 2002/0010783 A1 | 1/2002 | Primak et al. | |
| 2002/0012327 A1 | 1/2002 | Okada | |
| 2002/0019879 A1 | 2/2002 | Jasen et al. | |
| 2002/0023159 A1 | 2/2002 | Vange et al. | |
| 2002/0040400 A1 | 4/2002 | Masters | |
| 2002/0062372 A1 | 5/2002 | Hong et al. | |
| 2002/0099849 A1 | 7/2002 | Alfieri et al. | |
| 2002/0120697 A1 * | 8/2002 | Generous et al. | 709/206 |
| 2002/0129134 A1 | 9/2002 | Leighton et al. | |
| 2002/0191562 A1 | 12/2002 | Kumaki et al. | |
| 2003/0014540 A1 | 1/2003 | Sultan et al. | |
| 2003/0031178 A1 | 2/2003 | Haeri et al. | |
| 2003/0037165 A1 | 2/2003 | Shinomiya et al. | |
| 2003/0133420 A1 | 7/2003 | Haddad | |
| 2003/0161303 A1 | 8/2003 | Mehrvar et al. | |
| 2004/0071141 A1 | 4/2004 | Dhara et al. | |
| 2005/0111352 A1 | 5/2005 | Ho et al. | |
| 2005/0213832 A1 | 9/2005 | Schofield et al. | |

FOREIGN PATENT DOCUMENTS

| | | |
|---|---|---|
| WO | WO98/31107 | 7/1998 |
| WO | 2005/018176 | 2/2005 |

OTHER PUBLICATIONS

Akamai Technologies, Inc.—Global Internet Content Delivery- "How FreeFlow Works," webmaster@akamai.com 1999-2000.

Digital Island, Inc.—e-Business Without Limits-, "Enabling Technologies," http://www.digisle.net. No date.

Internap, "Preferred Collocation Services," http://www.internap.com Copyright © 2001 Internap Network Services Corporation.

Meyer, et al., Request for Comments No. 2026, entitled, "Generic Routing Encapsulation (GRE)," Jan. 2000, Internet Engineering Task Force, 9 pages.

Mockapetris, P., Request for Comments No. 1034, entitled, "Domain Names—Concepts and Facilities," Nov. 1987, Internet Engineering Task Force, 31 pages.

Information Sciences Institute, Request for Comments No. 793, entitled, "Transmission Control Protocol—DARPA Internet Program—Protocol Specification," Sep. 1981, Internet Engineering Task Force, 49 pages.

David M. Gifford, "Replica Routing," U.S. Appl. No. 09/472,964, filed Dec. 28, 1999, 37 Pages.

Johnson et al., "Dynamic Server Organization," U.S. Appl. No. 09/294,837, filed Apr. 19, 1999, 42 Pages.

Lu et al., "Automatic Network Addresses Assignment and Translation Interference," U.S. Appl. No. 60/160,535, filed Oct. 20, 1999, 127 Pages.

Release notes for 3Com Corporation, "NETBuilder Family Bridge/Router", pp. 27-29, (Mar. 1994).

J. Moy, RFC 1247 "OSPF Version 2", Jul. 19, 1991.

D. Oran, RFC 1142 "OSI IS-IS Intra-domain Routing Protocol", Feb. 1990.

Black, Uyless, "TCP/IP and Related Protocols", McGraw-Hill, Inc., pp. 226-249, 1992.

T. Li, et al., RFC 2281 "Cisco Hot Standby Router Protocol (HSRP)," Mar. 1998.

K. Egevang et al., "The IP Network Address Translator (NAT)", Network Working Group, pp. 1-10, May 1994.

Y. Rekhter, et al, "*Address Allocation for Private Internets*," RFC: 1918, Network Working Group, Feb. 1996, 9 Pages.

P. Srisuresh, et al, "*Load Sharing Using IP Network Address Translation (LSNAT)*," RFC: 2391, Network Working Group, Aug. 1998, 18 Pages.

P. Srisuresh, et al, "*IP Network Address Translator (NAT) Terminology and Considerations*," RFC: 2663, Network Working Group, Aug. 1999, 30 Pages.

E. Gerich, "*Guidelines for Management of IP Address Space*," RFC: 1466, Network Working Group, May 1993, 10 Pages.

Chambless, et al., "Home Agent Redundancy Protocol (HARP)," Oct. 27, 1997.

Network Working Group, RFC 2002 "IP Mobility Support," Oct. 1996.

Kanekar, et al., "*Load Sharing and Redundancy Scheme*," U.S. Appl. No. 09/342,859, filed Jun. 29, 1999, 75 Pages.

Woundy, et al. "Routing Protocol Based Redundancy Design for Shared-Access Networks," U.S. Appl. No. 09/484,189, filed Jan. 18, 2000, 53 Pages.

Zang, et al. "Method for a Cable Modem to Rapidly Switch to a Backup CMTS," U.S. Appl. No. 09/484,611, filed Jan. 18, 2000, 53 Pages.

Zang, et al. "Cable Network Redundancy Architecture," U.S. Appl. No. 09/484,612, filed Jan. 18, 2000, 60 Pages.

Ian Wilson, "Redirection to a Virtual Router," U.S. Appl. No. 09/748,828, filed Dec. 26, 2000, 33 Pages.

Denny, et al. "Stateful Network Address Translation Protocol Implemented Over a Data Network," U.S. Appl. No. 09/735,199, filed Dec. 11, 2000, 67 Pages.

Leung, et al. "Robust HA Redundancy and Load Balancing," U.S. Appl. No. 10/008,494, filed Nov. 9, 2001, 53 Pages.

Kent Leung, "Mobile IP Mobility Agent Standby Protocol," U.S. Appl. No. 09/714,466, filed Nov. 14, 2000, 51 Pages.

C.E. Perkins and T. Jagannadh, "DHCP for Mobile Networking with TCP/IP," IBM, Watson Research Center IEEE, Apr. 1995.

3Com Corporation, "Configuring Boundary Routing System Architecture," NETBuilder Family Bridge/Router Release Notes, Mar. 1994, pp. 26-29.

PCT International Search Report with written opinion, Application No. PCT/US2004/019617, Int'l filing date Jun. 18, 2004, mailed Jul. 10, 2004.

Office Action dated Mar. 17, 1995 for U.S. Appl. No. 08/231,330.

Notice of Allowance dated Jul. 24, 1995 for U.S. Appl. No. 08/231,330.

Allowed Claims for U.S. Appl. No. 08/231,330.

International Search Report mailed on Aug. 24, 1995 for PCT Application No. PCT/US1995/04887.

Office Action dated Feb. 2, 2000 for U.S. Appl. No. 09/107,701.

Notice of Allowance dated Aug. 14, 2000 for U.S. Appl. No. 09/107,701.

Allowed Claims for U.S. Appl. No. 09/107,701.

Release notes for 3Com Corporation, "Conducting a Redundant Route for Network Resiliency," *NETBuilder Family Bridge/Router Release*, Mar. 1994, pp. 26-29.

Office Action for U.S. Appl. No. 09/714,466 dated Jun. 4, 2001.

Office Action for U.S. Appl. No. 09/714,466 dated Nov. 27, 2001.

Notice of Allowance for U.S. Appl. No. 09/714,466 dated May 21, 2002.

Allowed Claims for U.S. Appl. No. 09/714,466.

Office Action dated Nov. 15, 2002 for U.S. Appl. No. 09/342,859.

Final Office Action dated May 7, 2003 for U.S. Appl. No. 09/342,859.

Notice of Allowance dated Aug. 4, 2003 for U.S. Appl. No. 09/342,859.

Supplemental Notice of Allowance dated Oct. 3, 2003 for U.S. Appl. No. 09/342,859.

Allowed Claims for U.S. Appl. No. 09/342,859.

Office Action dated Dec. 15, 2004 for U.S. Appl. No. 10/723,371.

Notice of Allowance dated May 3, 2005 for U.S. Appl. No. 10/723,371.

Supplemental Notice of Allowance dated Sep. 15, 2005 for U.S. Appl. No. 10/723,371.

Allowed Claims for U.S. Appl. No. 10/723,371.

Information Sciences Institute, Request for Comments No. 793, entitled, "Transmission Control Protocol—DARPA Internet Program—Protocol Specification," Sep. 1981, Internet Engineering Task Force, 49 pages.

Office Action dated Mar. 17, 2009 for U.S. Appl. No. 11/190,696, 24 pgs.

S. Knight et al. "Virtual Redundancy Protocol", Apr. 1998, IETF, RFC 2338.

Office action dated Nov. 18, 2002 for U.S. Appl. No. 09/484,189.

Final Office action dated Apr. 21, 2003 for U.S. Appl. No. 09/484,189.

Office action dated Dec. 8, 2003 for U.S. Appl. No. 09/484,189.

Notice of Allowance dated Apr. 15, 2004 for U.S. Appl. No. 09/484,189.

Allowed claims for U.S. Appl. No. 09/484,189.

Office Action dated Feb. 12, 2008 for U.S. Appl. No. 10/899,668.

Final Office Action dated Aug. 20, 2008 for U.S. Appl. No. 10/899,668.

Office Action dated Feb. 12, 2003 for U.S. Appl. No. 09/484,911.

Office Action dated Mar. 18, 2003 for U.S. Appl. No. 09/484,911.

Final Office Action dated Aug. 15, 2003 for U.S. Appl. No. 09/484,911.

Office Action dated Jan. 21, 2004 for U.S. Appl. No. 09/484,911.

Final Office Action dated Aug. 10, 2004 for U.S. Appl. No. 09/484,911.

Office Action dated Feb. 16, 2005 for U.S. Appl. No. 09/484,911.

Office Action dated Jul. 19, 2005 for U.S. Appl. No. 09/484,911.

Notice of Allowance dated Jan. 5, 2006 for U.S. Appl. No. 09/484,911.

Allowed claims for U.S. Appl. No. 09/484,911.

Office Action dated Jan. 31, 2008 for U.S. Appl. No. 11/636,725.

Final Office Action dated Sep. 26, 2008 for U.S. Appl. No. 11/636,725.

Office Action dated Nov. 6, 2002 for U.S. Appl. No. 09/484,612.

Office Action dated Apr. 25, 2003 for U.S. Appl. No. 09/484,612.

Office Action dated Nov. 6, 2003 for U.S. Appl. No. 09/484,612.

Office Action dated Mar. 10, 2004 for U.S. Appl. No. 09/484,612.

Office Action dated Sep. 16, 2004 for U.S. Appl. No. 09/484,612.

Notice of Allowance dated Jun. 3, 2005 for U.S. Appl. No. 09/484,612.

Notice of Allowance dated Nov. 22, 2005 for U.S. Appl. No. 09/484,612.

Allowed claims for U.S. Appl. No. 09/484,612.

Office Action dated Apr. 10, 2003 for U.S. Appl. No. 09/476,188.

Notice of Allowance dated Sep. 8, 2003 for U.S. Appl. No. 09/476,188.

Allowed claims for U.S. Appl. No. 09/476,188.

Valloppillil, Vinod, "Cache Array Routing Protocol v1.0", Oct. 20, 1997, Internet-Draft, http://ds1.internic/net/internet-drafts/draft-vinod-carp-v1-02.txt, pp. 1-6.

Cisco Technology, Inc., "Configuring IP Routing Protocols," Dec. 10, 1997, http://www.cisco.com/univercd/data/doc/software/11_2/cnp1/5ciprout.htm#REF40277, pp. 1-6, 120-122.

Ousterhout, John K., "*A Trace-Driven Analysis of the UNIX 4.2 BSD File System*," Jan. 2, 1993, Computer Science Division, Electrical Engineering and Computer Science, University of California, Berkeley, CA, pp. 1-12.

Welch, Brent, "*A Comparison of the Vnode and Sprite File System Architectures*," Proceedings of the File System Workshop, May 1992, pp. 29-44.

Ousterhout, John K., "*Beating the I/O Bottleneck: A Case for Log-Structured File Systems*," Jan. 30, 1992, Computer Science Division, Electrical Engineering anc Computer Sciences, University of California, Berkeley, CA, pp. 1-17.

Martin Arlitt, Ludmila Cherkasova, John Dilley, Rich Friedrich and Tai Jin, of Hewlett-Packard Laboratories, "*Evaluating Content Management Techniques for Web Proxy Caches*," Apr. 30, 1999, 9 pages.

Cardellini et al., "Dynamic Load Balancing on Web-Server Systems," *Internet Computing, IEEE*, May-Jun. 1993, vol. 3, Issue 3, pp. 28-39.

Asit Dan et al., "Multimedia Caching Strategies for Heterogeneous Application and Server Environments," *Multimedia Tools and Application*, May 1997, vol. 4, No. 3, pp. 379-312.

Gibson et al., "File Server Scaling with Network-Attached Secure Disks," *Association for Computing Machinery*, 1997, pp. 272-284.

Pai et al., "Locality-Aware Request Distribution in Cluster-based Network Servers," *Association for Computing Machinery*, 1998, pp. 205-216.

Perkins et al., "Route Optimization for Mobile IP," *Cluster Computing*, Jun. 1998 vol. 1, No. 2, pp. 161-176.

Office Action dated Oct. 14, 2003 for U.S. Appl. No. 09/606,418.

Notice of Allowance dated Feb. 10, 2004 for U.S. Appl. No. 09/606,418.

Notice of Allowance dated Jul. 1, 2005 for U.S. Appl. No. 09/606,418.

Allowed claims for U.S. Appl. No. 09/606,418.

Office Action dated Dec. 2, 2003 for U.S. Appl. No. 09/608,802.

Office Action dated Mar. 15, 2004 for U.S. Appl. No. 09/608,802.

Final Office Action dated Dec. 1, 2004 for U.S. Appl. No. 09/608,802.

Office Action dated Sep. 20, 2005 for U.S. Appl. No. 09/608,802.

Final Office Action dated Mar. 2, 2006 for U.S. Appl. No. 09/608,802.

Office Action dated Sep. 6, 2006 for U.S. Appl. No. 09/608,802.

Final Office Action dated Jan. 30, 2007 for U.S.Appl. No. 09/608,802.

Notice of Allowance dated Oct. 25, 2007 for U.S. Appl. No. 09/608,802.

Allowed Claims for U.S. Appl. No. 09/608,802.

Gourlay et al., "Path Selection System," filed: Dec. 19, 2001, U.S. Appl. No. 10/034,368.

Office Action dated Apr. 15, 2003 for U.S. Appl. No. 09/569,090.

Final Office Action dated Oct. 1, 2003 for U.S. Appl. No. 09/569,090.

Notice of Allowance dated Jan. 9, 2004 for U.S. Appl. No. 09/569,090.
Supplemental Notice of Allowance dated Mar. 12, 2004 for U.S. Appl. No. 09/569,090.
Allowed claims for U.S. Appl. No. 09/569,090.
Office Action for dated Sep. 24, 2007 U.S. Appl. No. 10/851,456.
Notice of Allowance dated Mar. 7, 2008 for U.S. Appl. No. 10/851,456.
Allowed claims for U.S. Appl. No. 10/851,456.
Office Action dated Oct. 6, 2003 for U.S. Appl. No. 09/569,083.
Interview Summary dated Jan. 30, 2004 for U.S. Appl. No. 09/569,083.
Notice of Allowance dated Apr. 29, 2004 for U.S. Appl. No. 09/569,083.
Allowed claims for U.S. Appl. No. 09/569,083.
Office Action dated Aug. 13, 2003 for U.S. Appl. No. 09/605,917.
Final Office Action dated Feb. 2, 2004 for U.S. Appl. No. 09/605,917.
Office Action dated Jul. 13, 2004 for U.S. Appl. No. 09/605,917.
Final Office Action dated Apr. 27, 2005 for U.S. Appl. No. 09/605,917.
Notice of Allowance dated Aug. 18, 2005 for U.S. Appl. No. 09/605,917.
Allowed claims for U.S. Appl. No. 09/605,917.
International Search Report and Written Opinion mailed on Jul. 10, 2004 for PCT Application No. PCT/US2004/019617.
Office Action dated Apr. 20, 2004 for U.S. Appl. No. 09/748,828.
Notice of Allowance dated Dec. 21, 2004 for U.S. Appl. No. 09/748,828.
Allowed claims for U.S. Appl. No. 09/748,828.
Office Action dated Nov. 29, 2005 for U.S. Appl. No. 11/083,727.
Final Office Action dated Apr. 4, 2006 for U.S. Appl. No. 11/083,727.
Notice of Allowance dated Jun. 30, 3006 for U.S.Appl. No. 11/083,727.
Allowed claims for U.S. Appl. No. 11/083,727.
Office Action dated May 2, 2006 for U.S. Appl. No. 10/008,494.
Final Office Action dated Oct. 4, 2006 for U.S. Appl. No. 10/008,494.
Notice of Allowance dated Jan. 26, 2007 for U.S. Appl. No. 10/008,494.
Notice of Allowance dated Mar. 27, 2007 for U.S. Appl. No. 10/008,494.
Allowed Claims for U.S. Appl. No. 09/596,083.
Office Action dated Jan. 7, 2008 from EP Patent Application No. 04755658.4.
Examination Report dated Oct. 13, 2006 from EP Patent Application No. 04755658.4.
D. Farinacci, et al. Request for Comments No. 2784, entitled, "Generic Routing Encapsulation (GRE)," Mar. 200, Network Working Group.
Office Action dated Dec. 15, 2008 for Chinese Patent Application No. 200480021154.3.
Office Action dated Mar. 30, 2007 for U.S. Appl. No. 10/632,704.
Office Action dated Oct. 17, 2007 for U.S. Appl. No. 10/632,704.
Final Office Action dated May 9, 2008 for U.S. Appl. No. 10/632,704.
Notice of Allowance dated Apr. 30, 2009 for U.S. Appl. No. 10/632,704.
M. Arlitt, et al., Hewlett-Packard Laboratories, "*Evaluating Content Management Techniques for Web Proxy Caches*," Apr. 30, 1999, 9 pages.
Asit, et al., "Multimedia Caching Strategies for Heterogeneous Application and Server Environments," *Multimedia Tools and Application*, May 1997, vol. 4, No. 3, pp. 379-312.
Cardellini, et al., "Dynamic Load Balancing on Web-Server Systems," Internet Computing, IEEE, May-Jun. 1993, vol. 3, sue 3, pp. 28-39.
D. Farinacci, et al., Request for Comments No. 2784, entitled, "Generic Routing Encapsulation (GRE)," Jan. 2000, Network Working Group.
Gibson, et al., "File Server Scaling with Network-Attached Secure Disks," Association for Computing Machinery, 1997, pp. 272-284.
S. Knight, et al., "Virtual Redundancy Protocol", Apr. 1998, IETF, RFC 2338.

J. Ousterhout, "A Trace-Driven Analysis of the UNIX 4.2 BSD File System," Jan. 2, 1993, Computer Science Division, Electrical Engineering and Computer Science, University of California, Berkeley, CA, pp. 1-12.
J. Ousterhout, "Beating the I/O Bottleneck: A Case for Log-Structured File Systems," Jan. 30, 1992, Computer Science Division, Electrical Engineering and Computer Sciences, University of California, Berkeley, CA, pp. 1-17.
Pai, et al., "Locality-Aware Request Distribution in Cluster-based Network Servers," Association for Computing Machinery, 1998, pp. 205-216.
Perkins, et al., "Route Optimization for Mobile IP," *Cluster Computing*, Jun. 1998, vol. 1, No. 2, pp. 161-176.
Valloppillil, "Cache Array Routing Protocol v1.0", Oct. 20, 1997, Internet-Draft, http://ds1.internic/net/internet-drafts/draft-vinod-carp-v1-02.txt, pp. 1-6.
B. Welch, "A Comparison of the Vnode and Sprite File System Architectures," Proceedings of the File System Workshop, May 1992, pp. 29-44.
Release notes for 3Com Corporation, "Conducting a Redundant Route for Network Resiliency," *NETBuilder Family Bridge/Router Release*, Mar. 1994, pp. 26-29.
Information Sciences Institute, Request for Comments No. 793, entitled, "Transmission Control Protocol—DARPA Internet Program—Protocol Specification," Sep. 1981, Internet Engineering Task Force, 49 pages.
Cisco Technology, Inc., "Configuring IP Routing Protocols," Dec. 10, 1997, http://www.cco.com/univercd/data/doc/software/11_2/cnp1/5ciprout.htm#REF40277, pp. 1-6, 120-122.
PCT International Search Report mailed on Aug. 24, 1995 for PCT Application No. PCT/US1995/04887.
PCT International Search Report and Written Opinion mailed on Jul. 10, 2004 for PCT Application No. PCT/US2004/019617.
CN First Office Action dated Nov. 14, 2008 for Chinese Patent Application No. 200480021154.3.
CN Second Office Action dated May 22, 2009 for Chinese Patent Application No. 200480021154.3.
CN Third Office Action dated Oct. 9, 2009 for Chinese Patent Application No. 200480021154.3.
CN Fourth Office Action dated Mar. 23, 2010 for Chinese Patent Application No. 200480021154.3.
EP Examination Report dated Oct. 13, 2006 from EP Patent Application No. 04755658.4.
EP Office Action dated Jan. 7, 2008 from EP Patent Application No. 04755658.4.
EP Office Action dated Sep. 3, 2009 for EP 04755658.4.
US Office Action dated Mar. 17, 1995 for U.S. Appl. No. 08/231,330.
US Notice of Allowance dated Jul. 24, 1995 for U.S. Appl. No. 08/231,330.
US Office Action dated Feb. 2, 2000 for U.S. Appl. No. 09/107,701.
US Notice of Allowance dated Aug. 14, 2000 for U.S. Appl. No. 09/107,701.
US Office Action for U.S. Appl. No. 09/714,466 dated Jun. 4, 2001.
US Office Action for U.S. Appl. No. 09/714,466 dated Nov. 27, 2001.
US Notice of Allowance for U.S. Appl. No. 09/714,466 dated May 21, 2002.
US Office Action dated Nov. 15, 2002 for U.S. Appl. No. 09/342,859.
US Final Office Action dated May 7, 2003 for U.S. Appl. No. 09/342,859.
US Notice of Allowance dated Aug. 4, 2003 for U.S. Appl. No. 09/342,859.
US Supplemental Notice of Allowance dated Oct. 3, 2003 for U.S. Appl. No. 09/342,859.
US Office Action dated Dec. 15, 2004 for U.S. Appl. No. 10/723,371.
US Notice of Allowance dated May 3, 2005 for U.S. Appl. No. 10/723,371.
US Supplemental Notice of Allowance dated Sep. 15, 2005 for U.S. Appl. No. 10/723,371.
US Office Action dated Mar. 17, 2009 for U.S. Appl. No. 11/190,696.
US Final Office Action dated Oct. 15, 2009 for U.S. Appl. No. 11/190,696.
US Non-Final Office Action dated Sep. 1, 2010 for U.S. Appl. No. 11/190,696.

US Office action dated Nov. 18, 2002 for U.S. Appl. No. 09/484,189.
US Final Office action dated Apr. 21, 2003 for U.S. Appl. No. 09/484,189.
US Office action dated Dec. 8, 2003 for U.S. Appl. No. 09/484,189.
US Notice of Allowance dated Apr. 15, 2004 for U.S. Appl. No. 09/484,189.
US Office Action dated Feb. 12, 2008 for U.S. Appl. No. 10/899,668.
US Final Office Action dated Aug. 20, 2008 for U.S. Appl. No. 10/899,668.
US Office Action dated Jun. 9, 2009 for U.S. Appl. No. 10/899,668.
US Office Action dated Mar. 25, 2010 for U.S. Appl. No. 10/899,668.
US Office Action dated Feb. 12, 2003 for U.S. Appl. No. 09/484,611.
US Office Action dated Mar. 18, 2003 for U.S. Appl. No. 09/484,611.
US Final Office Action dated Aug. 15, 2003 for U.S. Appl. No. 09/484,611.
US Office Action dated Jan. 21, 2004 for U.S. Appl. No. 09/484,611.
US Final Office Action dated Aug. 10, 2004 for U.S. Appl. No. 09/484,611.
US Office Action dated Feb. 16, 2005 for U.S. Appl. No. 09/484,611.
US Office Action dated Jul. 19, 2005 for U.S. Appl. No. 09/484,611.
US Notice of Allowance dated Jan. 5, 2006 for U.S. Appl. No. 09/484,611.
US Office Action dated Jan. 31, 2008 for U.S. Appl. No. 11/636,725.
US Final Office Action dated Sep. 26, 2008 for U.S. Appl. No. 11/636,725.
US Office Action dated Nov. 6, 2002 for U.S. Appl. No. 09/484,612.
US Office Action dated Apr. 25, 2003 for U.S. Appl. No. 09/484,612.
US Office Action dated Nov. 6, 2003 for U.S. Appl. No. 09/484,612.
US Office Action dated Mar. 10, 2004 for U.S. Appl. No. 09/484,612.
US Office Action dated Sep. 16, 2004 for U.S. Appl. No. 09/484,612.
US Notice of Allowance dated Jun. 3, 2005 for U.S. Appl. No. 09/484,612.
US Notice of Allowance dated Nov. 22, 2005 for U.S. Appl. No. 09/484,612.
US Office Action dated Apr. 10, 2003 for U.S. Appl. No. 09/476,188.
US Notice of Allowance dated Sep. 8, 2003 for U.S. Appl. No. 09/476,188.
US Office Action dated Oct. 14, 2003 for U.S. Appl. No. 09/606,418.
US Notice of Allowance dated Feb. 10, 2004 for U.S. Appl. No. 09/606,418.
US Notice of Allowance dated Jul. 1, 2005 for U.S. Appl. No. 09/606,418.
US Office Action dated Dec. 2, 2003 for U.S. Appl. No. 09/608,802.
US Office Action dated Mar. 15, 2004 for U.S. Appl. No. 09/608,802.
US Final Office Action dated Dec. 1, 2004 for U.S. Appl. No. 09/608,802.
US Office Action dated Sep. 20, 2005 for U.S. Appl. No. 09/608,802.
US Final Office Action dated Mar. 2, 2006 for U.S. Appl. No. 09/608,802.
US Office Action dated Sep. 6, 2006 for U.S. Appl. No. 09/608,802.
US Final Office Action dated Jan. 30, 2007 for U.S. Appl. No. 09/608,802.
US Notice of Allowance dated Oct. 25, 2007 for U.S. Appl. No. 09/608,802.
US Office Action dated Jul. 9, 2009 for U.S. Appl. No. 12/020,467.
US Notice of Allowance dated Jan. 26, 2010 for U.S. Appl. No. 12/020,467.

US Office Action dated Apr. 15, 2003 for U.S. Appl. No. 09/569,090.
US Final Office Action dated Oct. 1, 2003 for U.S. Appl. No. 09/569,090.
US Notice of Allowance dated Jan. 9, 2004 for U.S. Appl. No. 09/569,090.
US Supplemental Notice of Allowance dated Mar. 12, 2004 for U.S. Appl. No. 09/569,090.
US Office Action for dated Sep. 24, 2007 U.S. Appl. No. 10/851,456.
US Notice of Allowance dated Mar. 7, 2008 for U.S. Appl. No. 10/851,456.
US Office Action dated Oct. 6, 2003 for U.S. Appl. No. 09/569,083.
US Notice of Allowance dated Apr. 29, 2004 for U.S. Appl. No. 09/569,083.
US Office Action dated Aug. 13, 2003 for U.S. Appl. No. 09/605,917.
US Final Office Action dated Feb. 2, 2004 for U.S. Appl. No. 09/605,917.
US Office Action dated Jul. 13, 2004 for U.S. Appl. No. 09/605,917.
US Final Office Action dated Apr. 27, 2005 for U.S. Appl. No. 09/605,917.
US Notice of Allowance dated Aug. 18, 2005 for U.S. Appl. No. 09/605,917.
US Office Action dated Apr. 20, 2004 for U.S. Appl. No. 09/748,828.
US Notice of Allowance dated Dec. 21, 2004 for U.S. Appl. No. 09/748,828.
US Office Action dated Nov. 29, 2005 for U.S. Appl. No. 11/083,727.
US Final Office Action dated Apr. 4, 2006 for U.S. Appl. No. 11/083,727.
US Notice of Allowance dated Jun. 30, 2006 for U.S. Appl. No. 11/083,727.
US Office Action dated May 2, 2006 for U.S. Appl. No. 10/008,494.
US Final Office Action dated Oct. 4, 2006 for U.S. Appl. No. 10/008,494.
US Notice of Allowance dated Jan. 26, 2007 for U.S. Appl. No. 10/008,494.
US Notice of Allowance dated Mar. 27, 2007 for U.S. Appl. No. 10/008,494.
US Office Action dated Mar. 30, 2007 for U.S. Appl. No. 10/632,704.
US Office Action dated Oct. 17, 2007 for U.S. Appl. No. 10/632,704.
US Final Office Action dated May 9, 2008 for U.S. Appl. No. 10/632,704.
US Notice of Allowance dated Apr. 30, 2009 for U.S. Appl. No. 10/632,704.
Lu et al., "Method and Apparatus for Automatic Network Address Assignment," U.S. Appl. No. 60/178,063, filed Jan. 24, 2000, 74 Pages.
Johnson et al., "Method and Apparatus for Determining a Network Topology in the Presence of Network Address Translation," U.S. Appl. No. 60/178,062, filed Jan. 24, 2000, 32 Pages.
Toole et al., "Fast-Changing Network Status and Load Monitoring and Feedback," U.S. Appl. No. 60/177,985, filed Jan. 25, 2000, 20 Pages.
Kirk Johnson, "A Method and Apparatus for Minimalist Approach to Implementing Server Selection," U.S. Appl. No. 60/177,415, filed Jan. 21, 2000, 39 Pages.

* cited by examiner

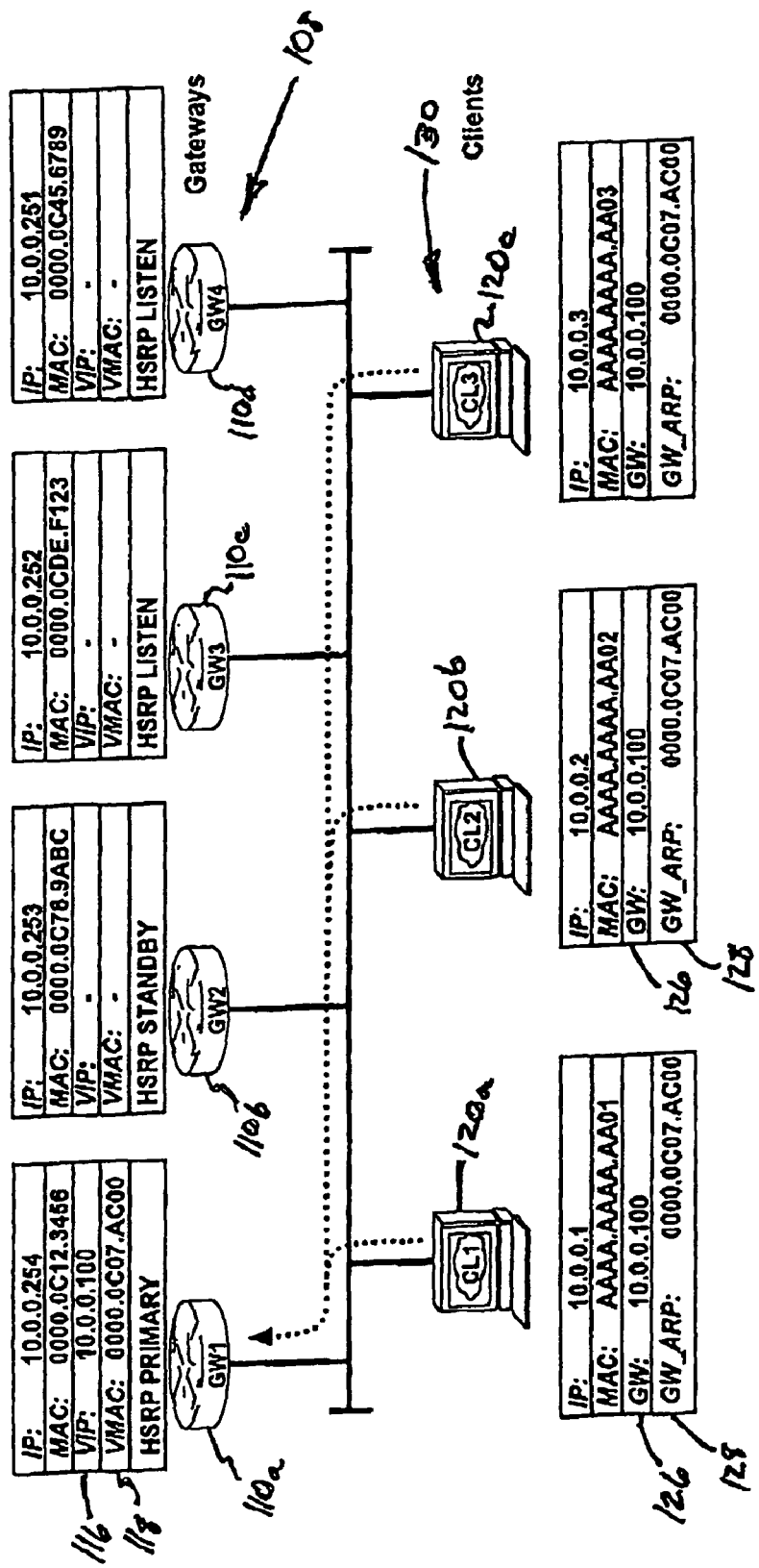
Figure 1. HSRP with 4 participating routers in Normal mode

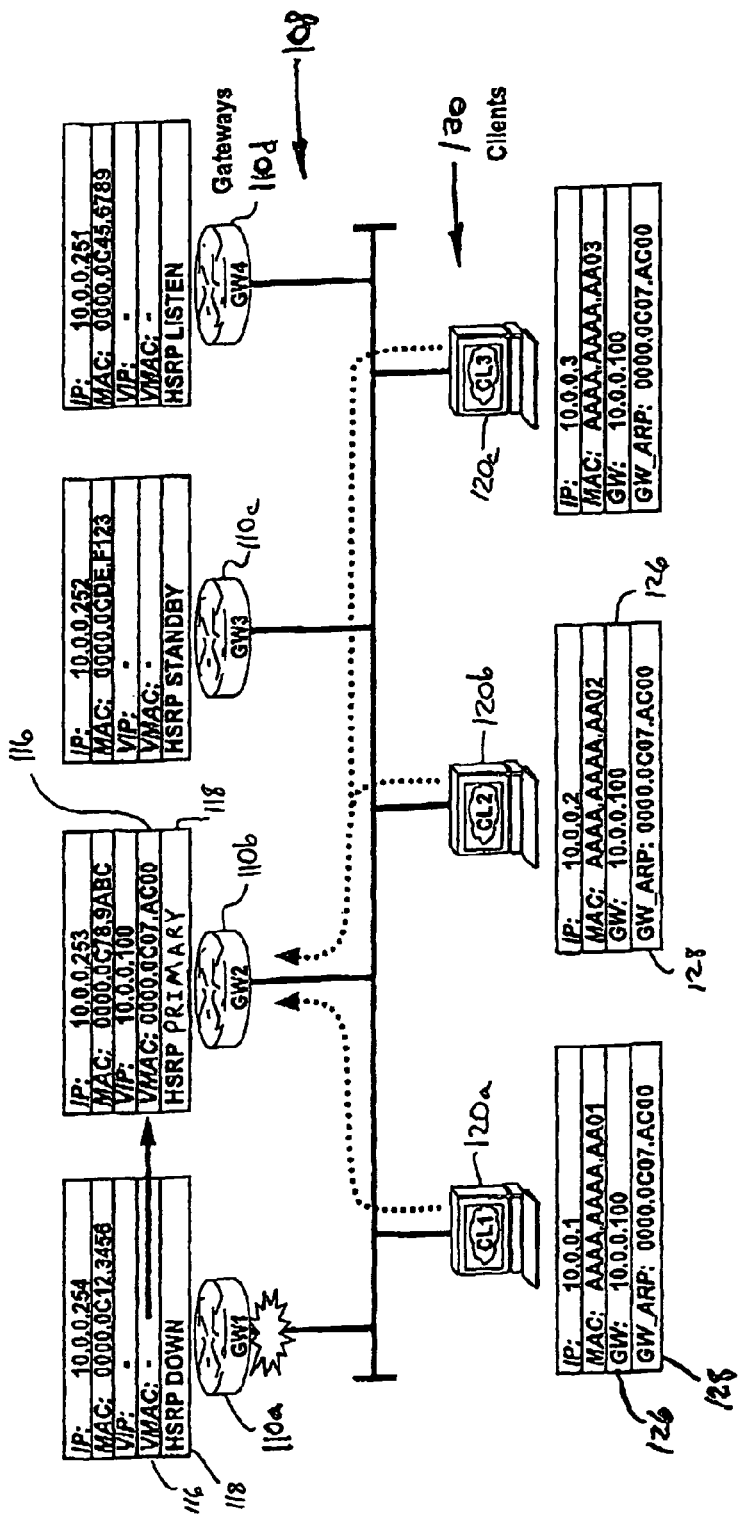
Figure 2. HSRP with 4 participating routers in Failover mode
PRIOR ART

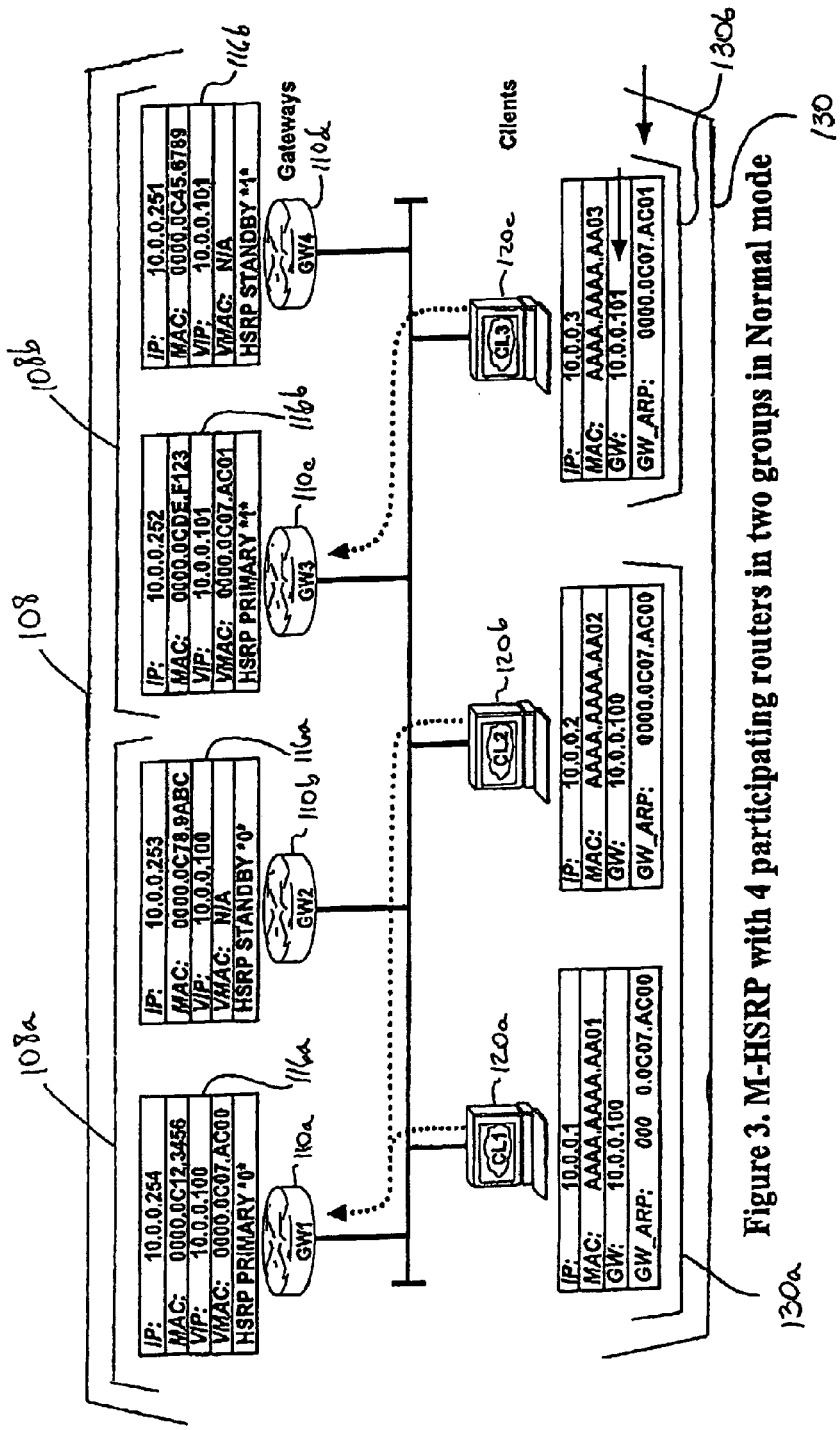
Figure 3. M-HSRP with 4 participating routers in two groups in Normal mode
PRIOR ART

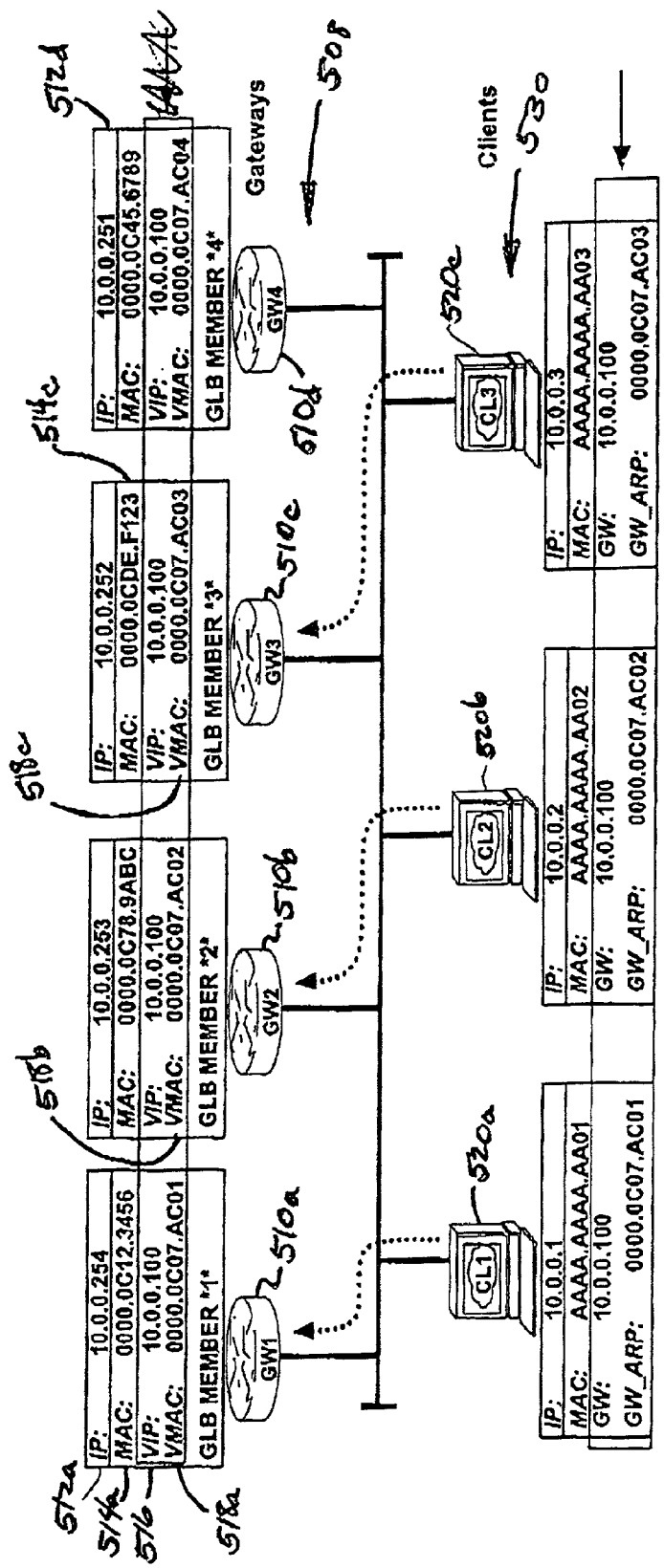
Figure 5: GLB Service with 4 participating routers implementing load-balancing

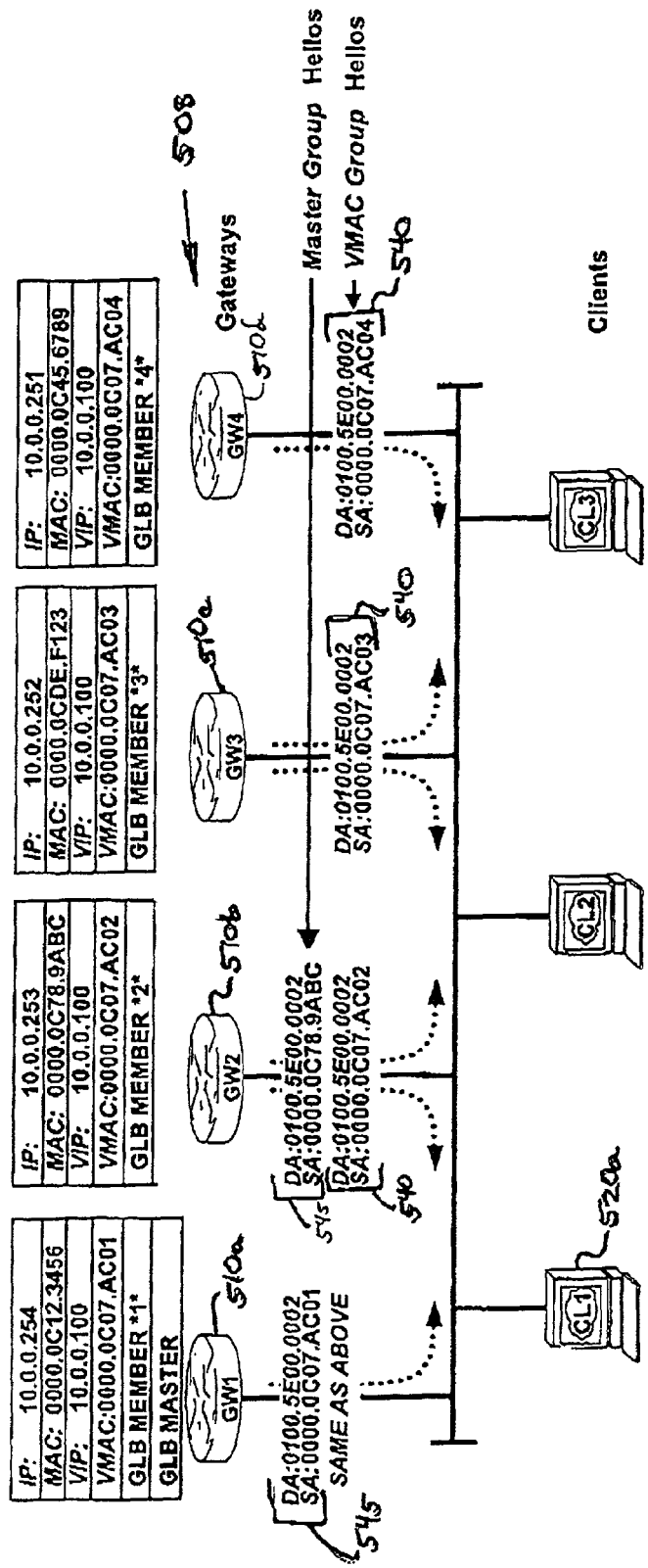
Figure 6. GLB Service hello mechanism derived from HSRP

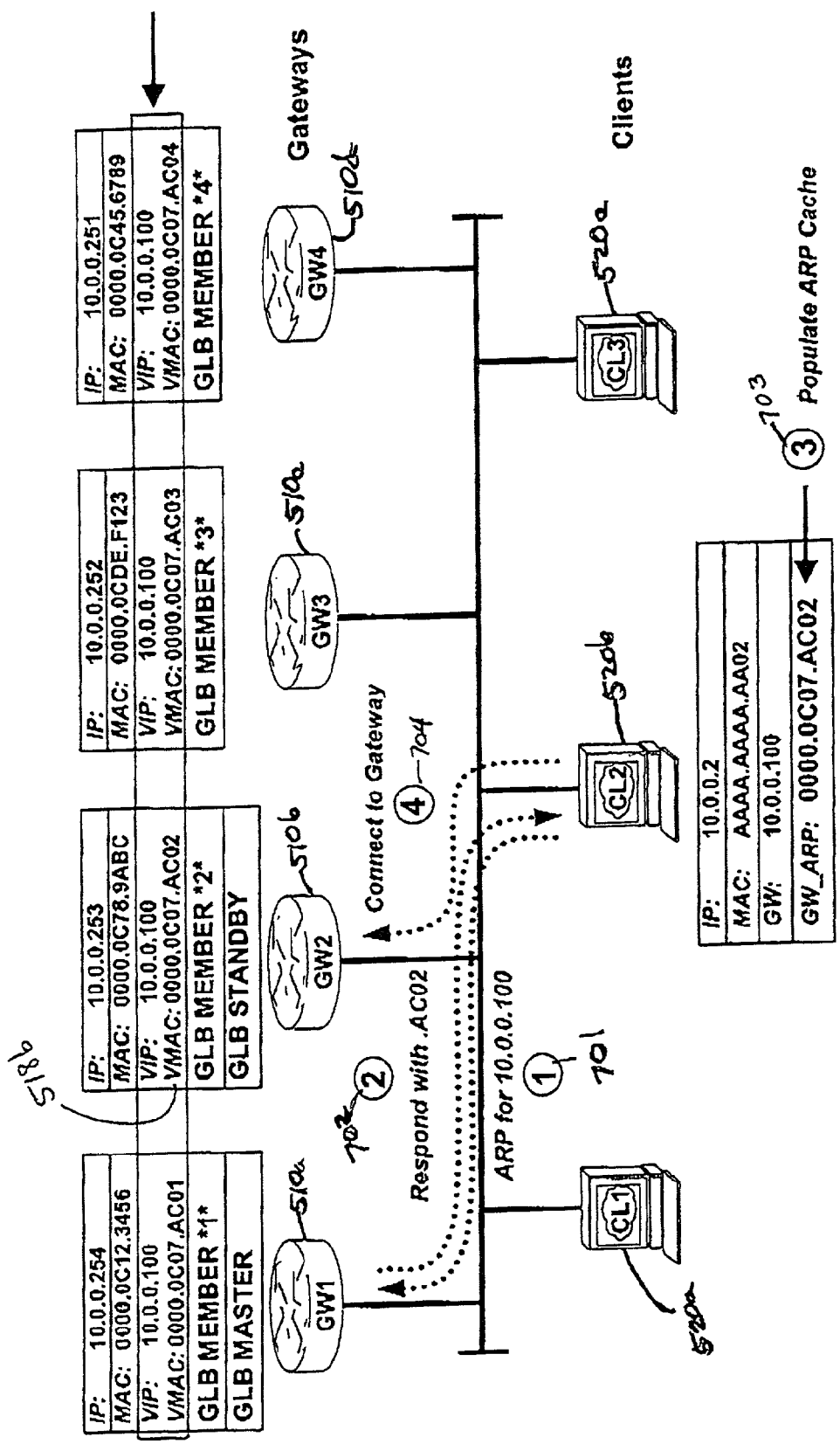
Figure 7. GLB Service conditional response mechanism

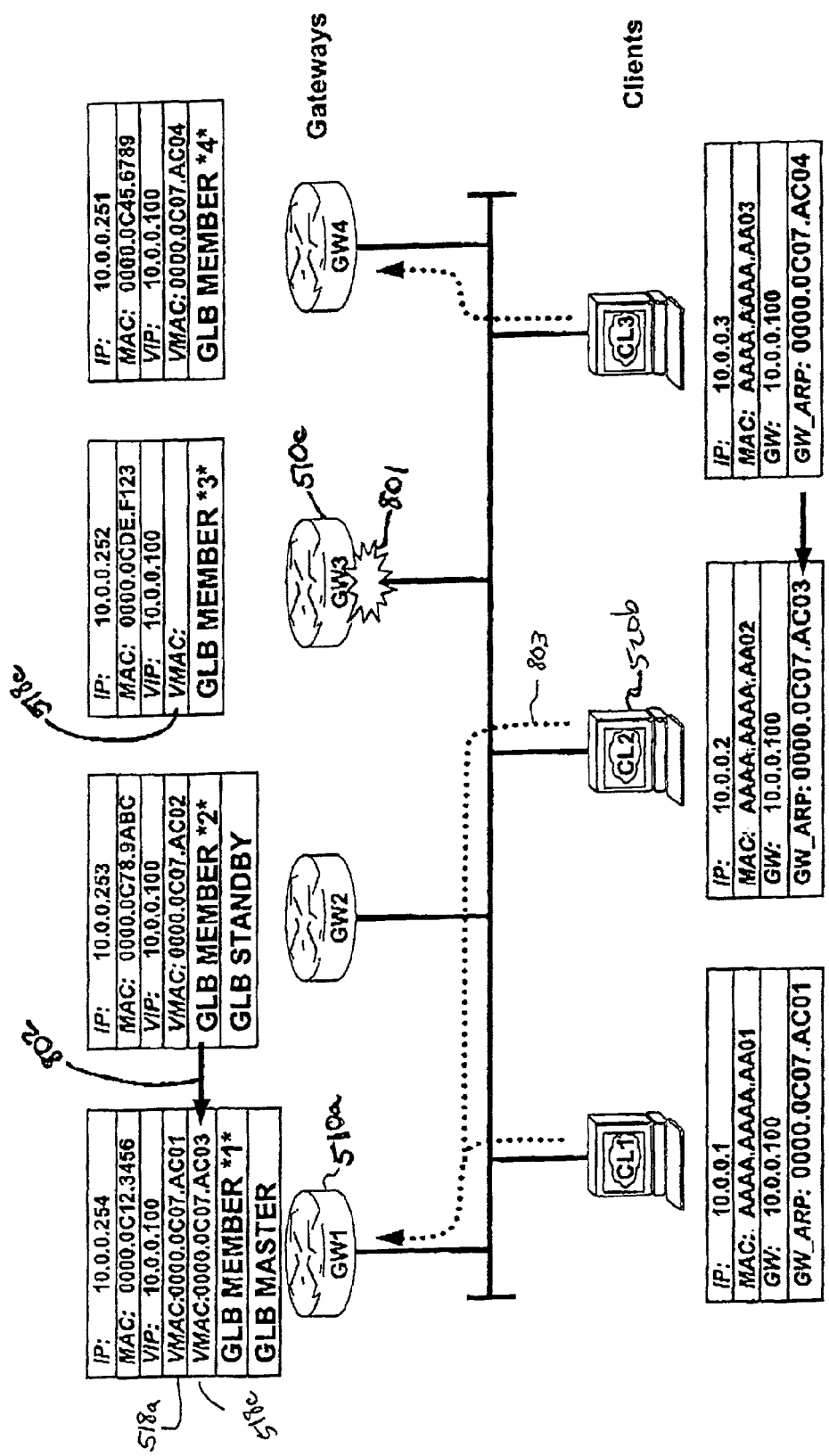
Figure 8A. Recovery of Failed Slave Member by Master

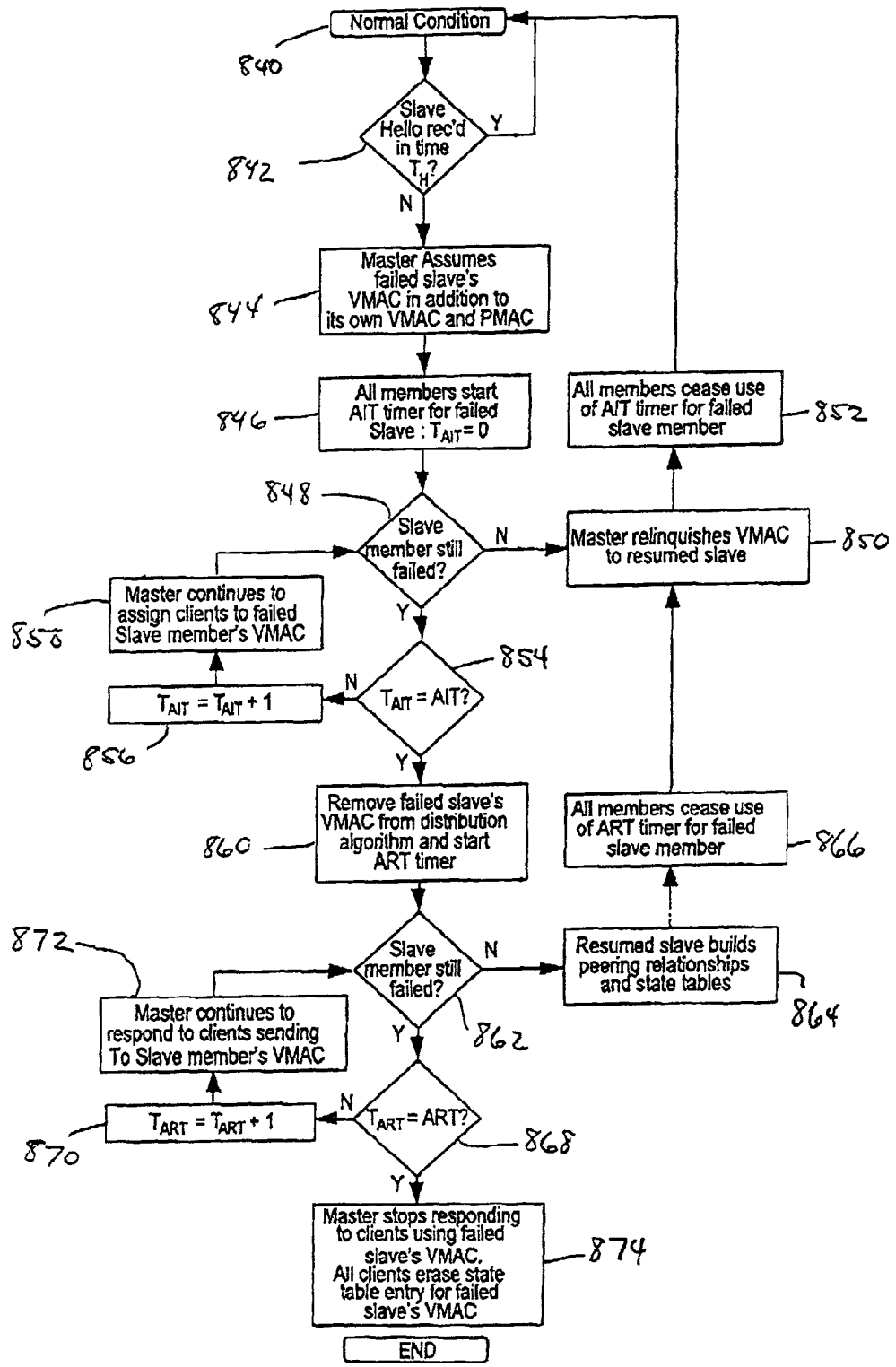
Figure 8B – Failure of a Slave Member

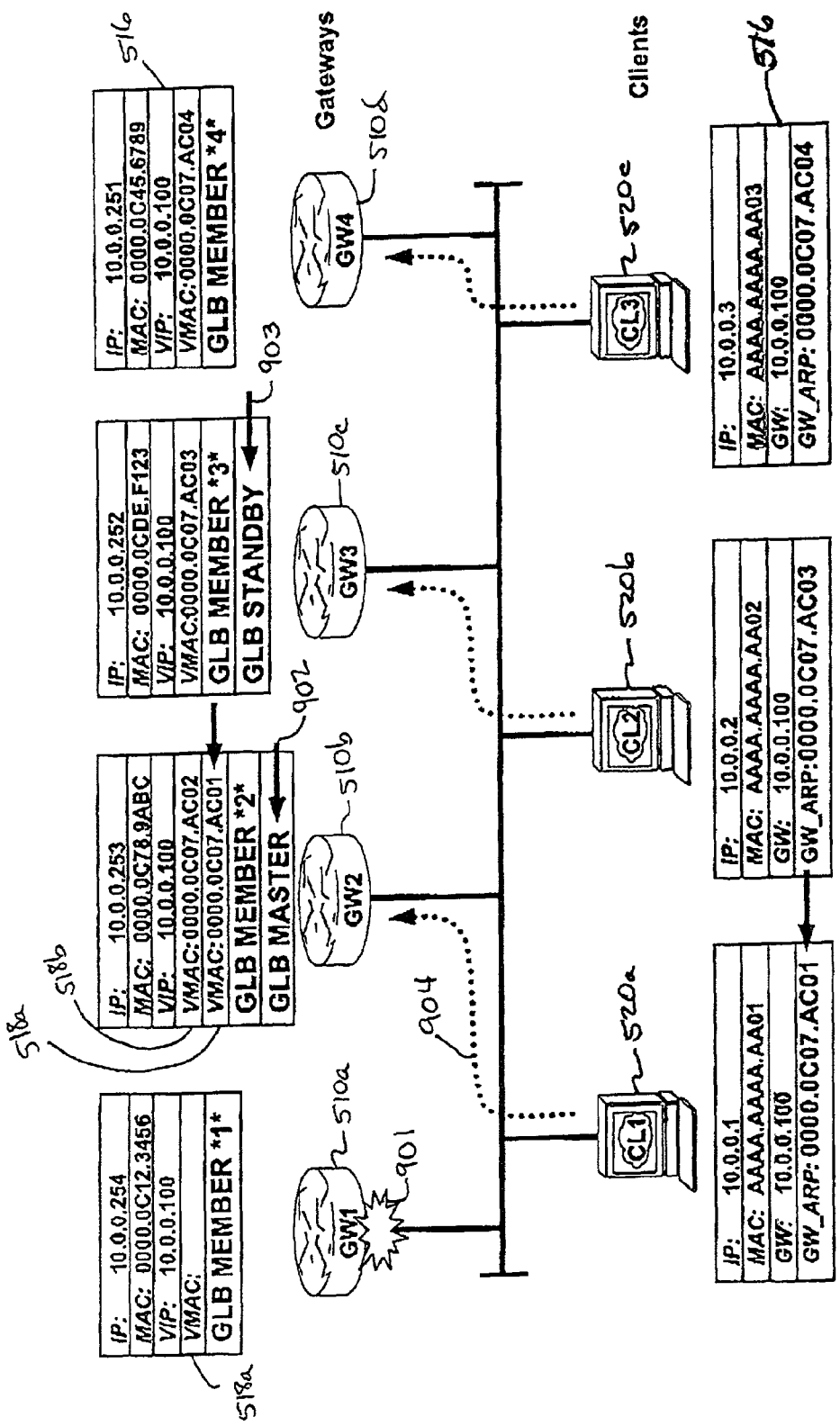
Figure 9A. Recovery of Failed Master Member by Next-in-Line Slave

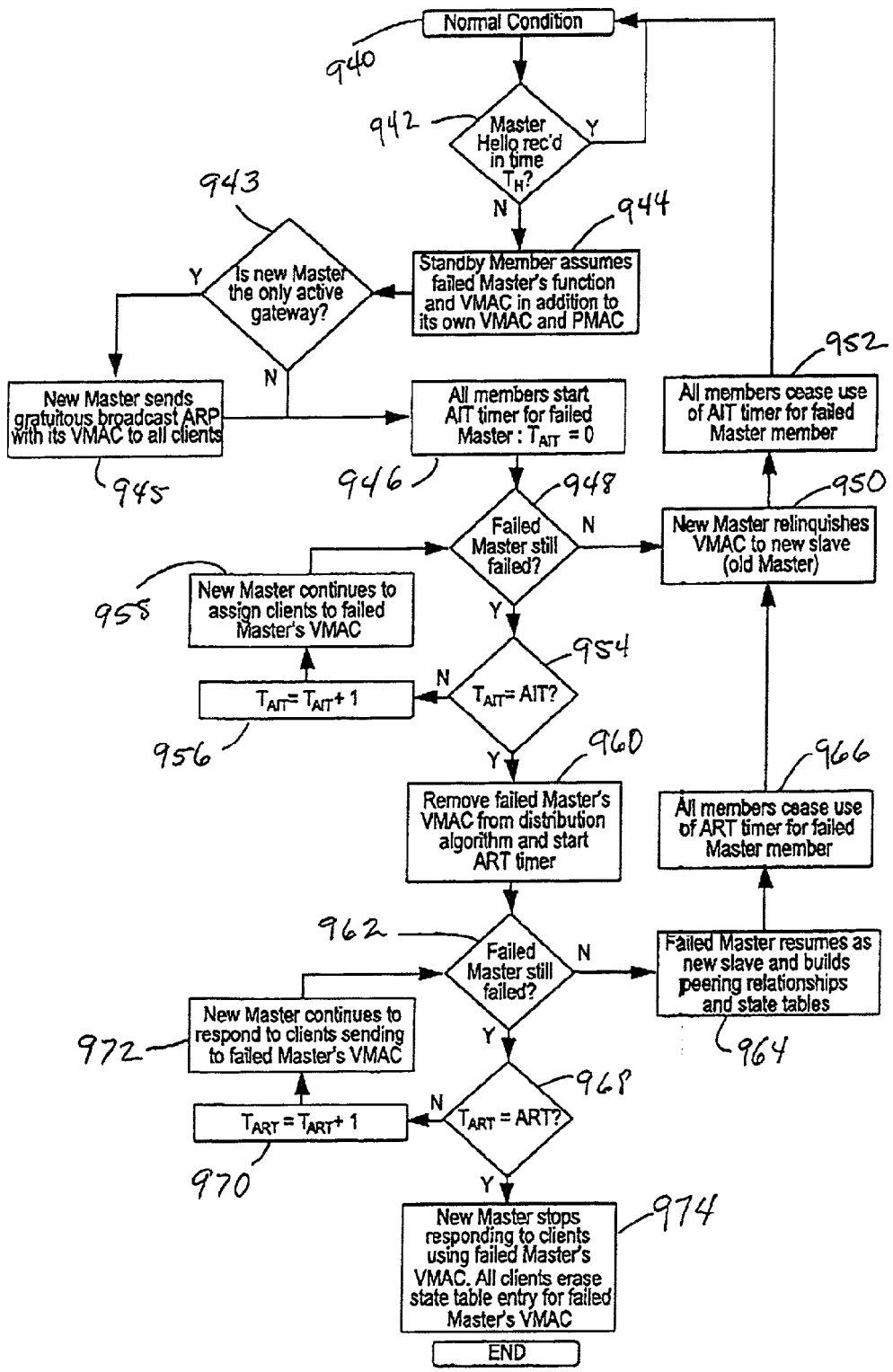
Figure 9B – Failure of a Master Member

GATEWAY LOAD BALANCING PROTOCOL

BACKGROUND OF THE INVENTION

The present invention relates generally to network systems having redundant default gateways and/or routers for receiving traffic from multiple hosts on a LAN. More particularly, the present invention relates to methods and apparatuses for deterministic load balancing across redundant gateway services for a common IP subnet.

Local area networks (LANs) are commonly connected with one another through one or more routers so that a host (a PC or other arbitrary LAN entity) on one LAN can communicate with other hosts on different LANs. Typically, the host is able to communicate directly only with the entities on its local LAN segment. When it receives a request to send a data packet to an address that it does not recognize as being local, it communicates through a router (or other layer-3 device) which determines how to direct the packet between the host and the destination address. Unfortunately, a router may, for a variety of reasons, become inoperative (e.g., a power failure, rebooting, scheduled maintenance, etc.). Such potential router failure has led to the development and use of redundant systems, systems having more than one router to provide a back up in the event of primary router failure. When a router fails, the host communicating through the inoperative router may still remain connected to other LANs if it can send packets to another router connected to its LAN.

Various protocols have been devised to allow a host to choose a router from among a group of routers in a network. Two of these, Routing Information Protocol (or RIP) and ICMP Router Discovery Protocol (IRDP) are examples of protocols that involve dynamic participation by the host. However, because both RIP and IRDP require that the host be dynamically involved in the router selection, performance may be reduced and special host modifications and management may be required.

In a widely used and somewhat simpler approach, the host recognizes only a single "default" router. In this approach, the host is configured to send data packets to the default router when it needs to send packets to addresses outside its own LAN. It does not keep track of available routers or make decisions to switch to different routers. This requires very little effort on the host's part, but has a serious danger. If the default router fails, the host can not send packets outside of its LAN. This will be true even though there may be a redundant router able to take over because the host does not know about the backup. Unfortunately, such systems have been used in mission critical applications such as stock trading. The shortcomings of these early systems led to the development and implementation of a hot standby router protocol (HSRP) by Cisco Systems, Inc. of San Jose, Calif. A more detailed discussion of the earlier systems and of an HSRP type of system can be found in U.S. Pat. No. 5,473,599 (referred to herein as "the '599 patent"), entitled STANDBY ROUTER PROTOCOL, issued Dec. 5, 1995 to Cisco Systems, Inc., which is incorporated herein by reference in its entirety for all purposes. Also, HSRP is described in detail in RFC 2281, entitled "Cisco Hot Standby Router Protocol (HSRP)", by T. Li, B. Cole, P. Morton and D. Li, which is incorporated herein by reference in its entirety for all purposes.

HSRP forwards data packets from a host on a LAN through a virtual router. The host is configured so that the packets it sends to destinations outside of its LAN are always addressed to the virtual router. The virtual router may be any physical router elected from among a group of routers connected to the LAN. The router from the group that is currently emulating the virtual router is referred to as the "active" router. Thus, packets addressed to the virtual router are handled by the active router. A "standby" router, also from the group of routers, backs up the active router so that if the active router becomes inoperative, the standby router automatically begins emulating the virtual router. This allows the host to always direct data packets to an operational router without monitoring the routers of the network.

A Cisco HSRP system is shown in FIGS. 1-3. As seen in FIG. 1, four gateways 110a-d (for example, routers) operate in a normal mode, providing redundant default gateway services in an active/standby configuration for a common IP subnet. In FIG. 1, the multiple routers 110 (layer-3 switches) form a redundancy group 108 (RG) and share a virtual MAC address 118 and a virtual IP address 116. Hosts 120a-c on a common subnet 130 set their default gateway IP address 126 and MAC address 128 to the virtual addresses 116, 118 within RG 108 for their subnet. In RG 108, a "primary" RG member 110a is elected based on pre-configured priorities. The primary member 110a of the RG 108 responds to all address resolution protocol ("ARP") requests for the virtual IP address 116, thereby providing default gateway services for all hosts 120 of the common subnet 130 during normal operation. During normal operation, one or more secondary RG members 110b-c of the RG 108 remain in a standby mode. If the primary member 110a of the RG 108 should fail, as shown in FIG. 2, a secondary member 110b will assume the virtual MAC and IP addresses 118, 116, effectively becoming the primary member and thereby providing uninterrupted gateway services to the hosts 120 of common subnet 130 without the need for additional ARP discovery/resolution. While this configuration provides a reliable fail-over function for the gateway devices, the standby members of the RG, while in standby mode in the default configuration, provide no function and carry no traffic initiated by the hosts. Current systems provide no ability to pass traffic initiated within a single common subnet through multiple members of an RG sharing a single virtual gateway IP address in a load balancing arrangement.

Multiple redundancy group versions of the system of FIGS. 1 and 2 are available options, whereby multiple RGs can be configured for a common subnet, each RG possessing its own virtual gateway IP address. As seen in FIG. 3, hosts 120 are configured statically, or via a system such as Cisco's implementation of the Dynamic Host Configuration Protocol (DHCP), as multiple user groups 130a, 130b to use the multiple default gateway IP addresses 116a, 116b, respectively, assigned to RGs 108a, 108b. In RG 108a, member 110a has assumed the primary RG member role, while member 110b is initially a standby member. Members 110c and 110d occupy analogous positions, respectively, within RG 108b. Each grouping of users and RGs then functions as an "independent" system.

This multiple RG configuration provides a load balancing function, but it is through the use of multiple default gateway IP addresses in a common subnet. This requires dividing users/hosts into multiple user groups and configuring the routers as multiple RGs. The administrative task of dividing hosts among multiple default gateways can be tedious and requires customization of the system which many users would prefer to avoid.

Cisco Systems offers multiple methods for load balancing across redundant uplinks from an access layer switch in an enterprise campus or a service provider data center. One method, shown in FIG. 4a, involves using layer-2 mechanisms, which include an additional spanning tree feature from Cisco called Per-VLAN-Spanning-Tree (PVST). With PVST, two or more VLANs (virtual LANs; a VLAN is a LAN based on logical connections instead of physical connections, thereby providing added flexibility) are created on the access layer switch. Using PVST spanning tree tuning, load balancing is achieved by "tuning" half of the VLANs (for example, VLAN-A 405a of FIG. 4a) so that the forwarding path is through one uplink 410 while the remainder of the VLANs (in FIG. 4a, VLAN-B 405b) are "tuned" to use the remaining uplink 420. These multiple VLANs also require multiple IP subnets and a user community that is divided among the multiple VLANs, as seen in FIG. 4a. Using another feature from Cisco called UplinkFast, quick fail-over can be achieved should an individual uplink fail. This load balancing implementation requires a spanning-tree protocol ("STP") to be present in a triangular switch arrangement, as seen in FIG. 4a, whereby each access switch is homed to each distribution switch and the distribution switches are connected together trunking all VLANs 430, as seen in FIG. 4a. Many users, however, are relinquishing the need for STP in such triangular formations, meaning that PVST-based load balancing will no longer be an option.

As shown in FIG. 4b, in scenarios where STP does not exist in a triangular formation, Cisco's systems can load-share based on alternating the Cisco HSRP-primary function on the redundant layer-3 distribution switches for two or more VLANs-subnets (407a and 407b of FIG. 4b). However, multiple VLANs-subnets are again required on the access layer switch.

In both cases shown in FIGS. 4a and 4b, load balancing is achieved on a per VLAN-subnet basis and requires the user to create a minimum of two VLANs-subnets in each access layer switch. Many users would prefer not having to create a minimum of two VLANs-subnets per access layer switch to achieve load balancing, and yet want to make use of the redundant uplink potential bandwidth. In many cases, it is sufficient to create only one VLAN in each access layer switch. However, as seen from the foregoing examples, a one VLAN system can defeat current load balancing schemes.

Other Cisco features such as protocol filtering, CGMP/IGMP-snooping, and broadcast filtering allow a user to scale a single VLAN to increasingly larger size, often alleviating the need for multiple access VLANs form broadcast domain segmentation. As a result, there is a tendency to have fewer VLANs (and, often, preferably one VLAN) while the need for load balancing among redundant gateways persists. Current methods requiring multiple VLANs at the access layer to achieve load balancing may not suffice or work within various users' systems.

In view of the foregoing, it would be desirable to provide redundant gateway services similar to Cisco's HSRP while providing load balancing of host traffic from a common VLAN-subnet among multiple gateway devices. Such services would leverage resiliency mechanisms of systems like HSRP while adding load balancing capabilities.

SUMMARY OF THE INVENTION

The present invention relates to gateway load balancing systems using more than one gateway device in a gateway device group for communications directed outside of a LAN. Generally, the invention includes load balancing and failover services. In the load balancing arrangement, hosts that send ARP messages to a shared virtual IP address receive replies from one of the gateway devices in the gateway device group, directing the host to address outgoing communications to a virtual MAC address assigned to one of the gateway devices. Hosts are assigned virtual MAC addresses for the gateway devices according to a prescribed algorithm or methodology. In the event that one member of the gateway device group fails, the outgoing communications that would have been handled by the failed gateway device are re-assigned to another member of the gateway device group. A master gateway device controls address assignment and failover features. In the event that the master fails, additional steps are taken to appoint or elect a new master and ensure continuity in the load balancing function.

In one embodiment, a method of load balancing gateway services to hosts on a network segment includes receiving an ARP message from a host addressed to an address shared by a group of gateway devices available for serving the hosts on the network segment. In response to receiving the ARP message, and based on load balancing considerations, one of the gateway devices is selected to act as the addressee gateway device for the host that sent the ARP message. A reply to the ARP message is sent to the host identifying the selected addressee gateway device. The gateway devices can be layer 3 devices such as routers. The address shared by members of the gateway device group can be a virtual IP address for the group. When the reply message is sent, the reply message can contain a layer 2 address for the addressee gateway device, such as a virtual (secondary) MAC address.

According to another aspect of the present invention, a method providing gateway load balancing services is implemented on a single gateway device. When an ARP message is received from a host, a gateway device is selected from a group of available gateway devices available for servicing hosts on the network segment, utilizing a preselected algorithm or methodology. The selected gateway device then acts as the addressee gateway device for the host that sent the ARP message. The host is notified with a reply message identifying the addressee gateway device. When one of the gateway devices is determined to have failed, responsibility for gateway services of the failed gateway device are re-assigned to another gateway device in the group. The gateway devices again can be layer 3 devices.

A different aspect of the present invention includes a network segment that has multiple gateway devices sharing a virtual IP address. A group of hosts includes a host configured to send an ARP message to the shared address of the gateway devices. One of the gateway devices is configured to respond to the ARP message by sending the host a reply message identifying an addressee gateway device in the gateway device group. The network segment's group of gateway devices also can be configured to assume responsibility for any addressee gateway device that fails.

Another aspect of the invention pertains to computer program products including machine-readable media on which is stored program instructions for implementing at least some portion of the methods described above. Any of the methods of this invention may be represented, in whole or in part, as program instructions that can be provided on such computer readable media. In addition, the invention pertains to various combinations of data and data structures generated and/or used as described herein.

These and other advantages of the present invention will become apparent upon reading the following detailed descriptions and studying the various figures of the drawings.

BRIEF DESCRIPTION OF THE DRAWINGS

The present invention may best be understood by reference to the following description taken in conjunction with the accompanying drawings in which:

FIG. 1 is a schematic diagram of an HSRP gateway service for hosts in a LAN.

FIG. 2 is a schematic diagram of an HSRP gateway service for hosts in a LAN showing a failover mode when one of the gateway devices fails.

FIG. 3 is a schematic diagram of an M-HSRP gateway service for hosts in a LAN.

FIG. 5a is a schematic diagram of one embodiment of the present invention showing a load balancing implementation.

FIG. 6 is a schematic diagram showing the hello mechanism of the embodiment of the present invention illustrated in FIG. 5a.

FIG. 7 is the embodiment of FIG. 5a showing the conditional response mechanism.

FIG. 8a is a schematic diagram of the embodiment of FIG. 5a showing failure of a slave gateway device.

FIG. 8b is a flowchart showing the methodology employed in one embodiment of the present invention showing failure of a slave gateway device.

FIG. 9a is a schematic diagram of the embodiment of FIG. 5a showing failure of a master gateway device.

FIG. 9b is a flowchart showing the methodology employed in one embodiment of the present invention showing failure of a master gateway device.

DETAILED DESCRIPTION OF THE EMBODIMENTS

1. Definitions

Figure 4B:
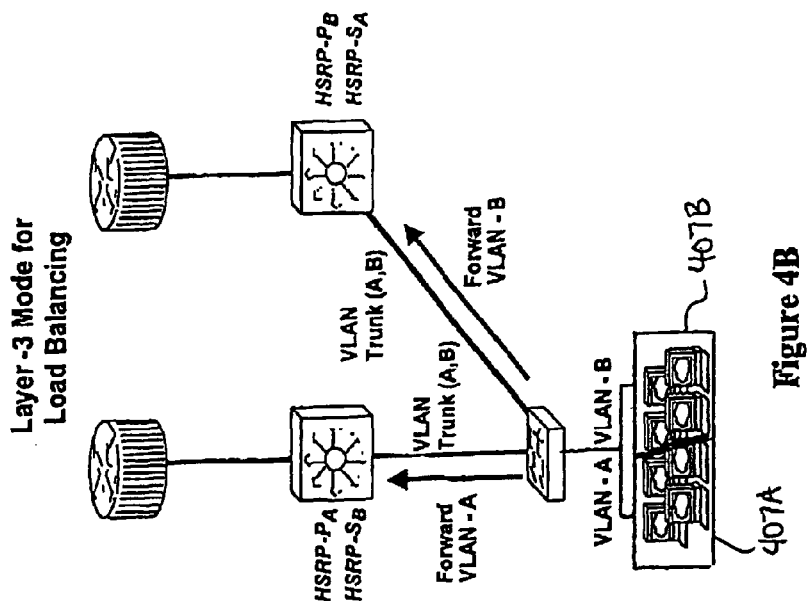
FIG. 4b is a diagram showing a layer 3 load balancing scheme.
Figure 4A:
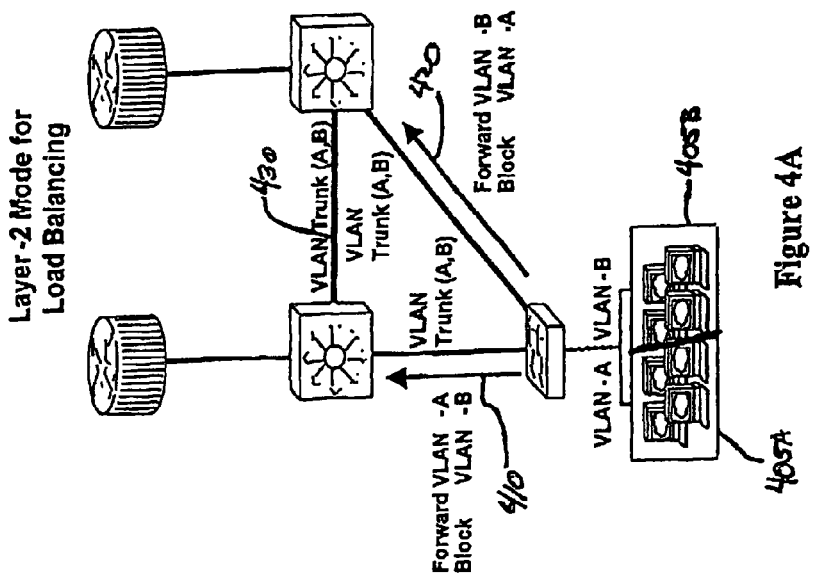
FIG. 4a is a diagram showing a layer 2 load balancing scheme using a spanning tree feature.

Reference will now be made in detail to the preferred embodiment of the invention. An example of the preferred embodiment utilizing products, protocols, methods, systems and other technology developed, sold and/or used by Cisco Systems is illustrated in the accompanying drawings. While the invention will be described in conjunction with that preferred embodiment, it will be understood that it is not intended to limit the invention to one preferred embodiment or to its implementation solely in connection with Cisco products and systems. On the contrary, the following description is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The following terms are used in the instant specification. Their definitions are provided to assist in understanding the preferred embodiments described herein, but do not necessarily limit the scope of the invention.

A "host" is a PC or other arbitrary network entity residing on a LAN that periodically communicates with network entities outside of its own LAN through a router or bridge. Other terms that may be used equivalently in this disclosure include user, host and host.

A "router" is a piece of hardware which operates at the network layer to direct packets between various LANs or WANs of a network. The network layer generally allows pairs of entities in a network to communicate with each other by finding a path through a series of connected nodes. Other terms that may be used equivalently in this disclosure include layer 3 switch, layer 3 device and gateway.

An "IP (internes protocol) address" is a network layer address for a device operating in the IP suite of protocols. The IP address is typically a 32 bit field, at least a portion of which contains information corresponding to its particular network segment. Thus, the IP address of a router may change depending upon its location in a network.

A "MAC address" is an address of a device at the data link layer, defined by the IEEE 802 committee that deals with issues specific to a particular type of LAN. The types of LANs for which MAC addresses are available include token ring, FDDI, and ethernet. A MAC address is generally intended to apply to a specific physical device no matter where it is plugged into the network. Thus, a MAC address is generally hardcoded into the device—on a router's ROM, for example. This should be distinguished from the case of a network layer address, described above, which changes depending upon where it is plugged into the network. MAC is an acronym for Media Access Control.

A "virtual address" is an address shared by a group of real network entities and corresponding to a virtual entity. In the context of this invention, one router from among a group of routers emulates a virtual router by adopting one or more virtual addresses, and another entity (usually a host) is configured to send data packets to such virtual address(es), regardless of which router is currently emulating the virtual router. In the preferred embodiments, the virtual addresses encompass both MAC layer and network layer (IP) addresses. Usually, various members of the group each have the capability of adopting the virtual address to emulate a virtual entity.

A "packet" is a collection of data and control information including source and destination node addresses, formatted for transmission from one node to another. In the context of this invention, it is important to note that hosts on one LAN send packets to hosts on another LAN through a router or bridge connecting the LANs.

2. Overview

Hosts (for example, workstations, users and/or data center servers) using the IP protocol must utilize a default gateway to exit a local network and access remote networks. Therefore, each host must have prior knowledge of the gateway's IP address which typically is a router or layer-3 switch IP address. Hosts are either statically configured with the IP address of the default gateway or are assigned the address through a configuration protocol (such as Cisco's DHCP) upon boot-up. In either case, the host uses the same default gateway IP address for all network traffic destined to exit the local network.

To forward traffic to the default gateway, the host must perform an IP-ARP resolution to learn the data-link MAC address of the default gateway. The host sends an ARP inquiry to the IP address of the gateway, requesting the gateway's MAC address. The default gateway will respond to the host's ARP by notifying the host of the gateway's MAC address. The host needs the default gateway's MAC address to forward network traffic to the gateway via a data-link layer transfer. In networks that promote resiliency through redundant access layer uplinks and layer-3 gateways, at least two possible paths and devices exist for IP gateway services.

The present invention allows load-sharing of traffic from access layer hosts within a common subnet through redundant default gateways, while also providing a fail-over capability. One way to direct traffic from access layer hosts to a particular default gateway is to have the gateway respond to a host's ARP request with the gateway's own unique MAC address. Once a particular gateway responds to an ARP request from a host with the gateway's unique MAC address, the host caches the response and will continue to use the cached gateway MAC address for all transmissions leaving the local subnet. Therefore, if the MAC addresses of all of the redundant layer-3 gateways in an RG are sent in a distributed manner in response to ARP queries from various hosts, future transmissions from the hosts can be divided among available gateways to exit the local network, achieving load balancing of the outgoing packets.

Resiliency (fail-over) services also can be provided so that if one gateway should fail, a remaining gateway will assume the failed gateway's host load in addition to the remaining gateway's own load. The failure and load assumption can remain transparent to the local hosts. In addition, the load balancing feature must ignore the fact that more than one device can accept traffic destined to the same IP address, namely redundant default gateway devices sharing a common IP address.

Therefore, the present invention directs local hosts to a variety of possible default gateways in a load balancing arrangement using IP-ARP mechanisms, while using a single virtual IP address for the balanced gateway service. One embodiment of the present invention is shown in FIG. 5a and covered in detail in the following description. The exemplary configuration of FIG. 5a will be used in further disclosures below concerning the peering, keep-alive, conditional response and fail-over features of the present invention. However, FIG. 5a is intended only to provide an illustrative example of one embodiment of the present invention and does not limit the scope of the present invention in any way.

3. Exemplary Embodiment

Many of the concepts and mechanisms and much of the terminology used in the disclosure of the present invention are similar to and/or based on Cisco's HSRP system. However, the invention is in no way limited to such an implementation and those skilled in the art will recognize and appreciate that various embodiments of the present invention are achievable without using the HSRP system, per se.

One embodiment of the present invention provides three primary functions once it is implemented and configured. Initially, the system creates an addressing scheme. Once the addressing step is completed, the system provides its three primary functions:

(1) a peering and keep-alive plan which forms and maintains a layer-3 gateway RG for load balancing and resiliency services;

(2) a conditional ARP response scheme in which the RG members are assigned in a preselected manner to the hosts sending ARP inquiries; and (3) a fail-over procedure, which is executed should a member of the RG fail and which includes resumption and recovery mechanisms usable after the failure of one or more members of an RG.

a. Unique and Virtual Addressing of RG Members

As seen in FIG. 5a, a redundancy group (RG) 508 has various RG members 510a-d that each maintain a unique primary IP address (PIP address) 512 and a unique primary MAC address (PMAC address) 514. These PIP and PMAC addresses 512, 514 are used for intra-RG communication and can be used for other communications outside of the load balancing system of the present invention. The BIA (Burnt-In Address) of a device interface can be used as a PMAC address to ensure uniqueness. A user can assign a PIP address 512 to each layer-3 device 510 in the RG 508 being defined. As can be appreciated from FIG. 5a, these addresses are absolutely unique among the members 510 of RG 508.

Each RG member 510 also maintains its own virtual MAC address (VMAC address) 518 to be used by local IP hosts 520 to forward traffic destined to a specific RG member acting as a default gateway. The VMAC address 518 will be used in the ARP response to an IP host's request for the default gateway to assign a particular RG member to a particular host. A VMAC address 518 can be assigned to each RG member 510 by assigning each RG member 510 a unique HSRP-like group referred to as a "GLBP Group" or "VMAC Group" in which the RG device is the only member of its GLBP group. For example, in FIG. 5a, RG member 510b has been assigned to GLBP Group #2, giving member 510b the VMAC address 518b created by GLBP for Group #2, namely 0000.0007.AC02. In the preferred embodiment of the invention, each RG member is the only member of its VMAC Group for the sole purpose of acquiring a VMAC address.

The VMAC address adds some overhead to the system in the form of assigning RG members one additional MAC address. However, this cost is outweighed by the benefits of greater portability of the members of the group. For example, if one RG member was to be removed from service, the VMAC address could be assigned to another gateway device and the prior device removed without interruption in the service or the inconvenience of having to use an unchangeable address (for example, the BIA of a given RG member).

In the embodiment shown in FIG. 5a, the RG members 510 also use a common virtual IP address (VIP address) 516 that is shared by all members of RG 508 and used as a default gateway by all of the hosts 520 in the local subnet 530. The VIP address 516 can be assigned by the user and must be unique to the redundancy group 508 (though, of course, not unique within the group). Each RG member 510 must have the ability to receive packets destined for the common VIP address 516 and the RG member's own VMAC address 518a-d. In the preferred embodiment of the present invention, the VIP address 516 and the VMAC address 518 are installed as a permanent ARP entry in each RG member 510.

Even though multiple devices 510 will answer to the same VIP address 516, they will be associated with different VMAC addresses 518. Duplication of the VIP address 516 among RG member responding to the subnet will not be a problem if:

the system is enabled within a layer-2 switched environment (that is, utilizing and dependent upon MAC addresses);

ARP responses are directed as layer-2 unicasts to the requesting station so that RG members will not see other RG members' responses to ARP requests (that is, other RG members will not notice the duplicate address);

RG members avoid using their common VIP address when communicating with each other (using instead, for example, their PMAC addresses and/or PIP addresses);

RG members' ARP caches have permanent ARP entries installed for the VIP address and VMAC addresses to prevent any sort of interference; and any gratuitous ARP mechanisms on the RG members for the virtual IP address are disabled to ensure conflicts do not arise between members (although one exception exists for fail-over, which is described below).

As mentioned above, the RG members avoid seeing the duplicate VIP address because the responses to ARP requests are unicasts to the requesting host. Only one RG member responds to these ARP requests; the responding RG member is the "master" of the RG group, as defined below.

All RG members 510 belong to an HSRP-type group, designated the GLBP or VMAC Group, for the purpose of electing a master. To facilitate load balancing within an RG 508, a "master" is elected from among all eligible RG members 510 participating in the load balancing service (that is, from within the VMAC Group). Based on the individual priorities set for the VMAC Group on the RG members 510, the member with the highest priority is designated the master. As will be appreciated by those skilled in the art, any suitable criterion or criteria can be used to determine the master of the group. RG members not elected as master are "slaves" in the system. Similar to an "active" member of an HSRP group, the master in the system of the present invention is responsible for responding to all ARP requests directed to the shared \TIP address 516 within the RG 508.

Therefore, to implement a load balancing service according to one embodiment of the present invention, each RG member 510 will belong to the "VMAC Group" or "GLBP Group." A GLBP Group comprises 1 virtual IP address and "n" virtual MAC addresses. The GLBP master gateway assigns VMAC addresses to other members of the group. The GLBP Group is used for master election within the RG 508. The Group configuration includes a VIP address which is used as the shared default gateway by the hosts 520.

Generally, the gateway load balancing techniques (including use of virtual addresses) of the present invention may be implemented on software and/or hardware. For example, these techniques can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid load balancing service of this invention is preferably implemented on a general-purpose programmable machine selectively activated or reconfigured by a computer program stored in memory. Such programmable machine may be a network gateway device designed to handle network traffic. Such network devices typically have multiple network interfaces including frame relay and ISDN interfaces, for example. Specific examples of such network devices include routers and switches. For example, the gateway load balancing service of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the gateway load balancing service may be implemented on a general-purpose network host machine such as a personal computer or workstation. Further, the invention may be at least partially implemented on a card (e.g., an interface card) for a network device or a general-purpose computing device.

Figure 5B:
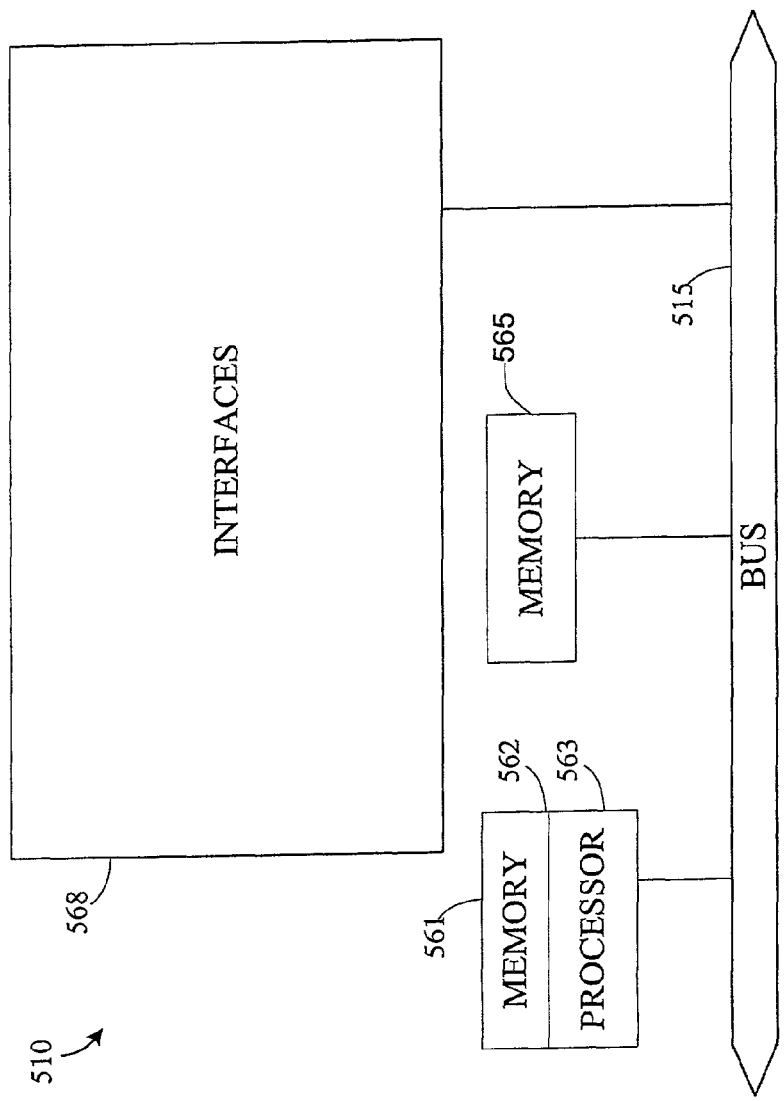
FIG. 5b is a block diagram of a network device that may be configured to act as a gateway device of this invention.

Referring now to FIG. 5*b*, a router 510 suitable for implementing the present invention includes a master central processing unit (CPU) 562, interfaces 568, and a bus 575 (e.g., a PCI bus). When acting under the control of appropriate software or firmware, the CPU 562 is responsible for such router tasks as routing table computations and network management. It may also be responsible for the functions of a gateway device as listed and described below. It preferably accomplishes all these functions under the control of software including an operating system (e.g., the Internetwork Operating System (IOS®) of Cisco Systems, Inc.) and any appropriate applications software. CPU 562 may include one or more processors 563 such as a processor from the Motorola family of microprocessors or the MIPS family of microprocessors. In an alternative embodiment, processor 563 is specially designed hardware for controlling the operations of router 510. In a specific embodiment, a memory 561 (such as non-volatile RAM and/or ROM) also forms part of CPU 562. However, there are many different ways in which memory could be coupled to the system. Memory block 561 may be used for a variety of purposes such as, for example, caching and/or storing data (including, for example, addresses), programming instructions, etc.

The interfaces 568 are typically provided as interface cards (sometimes referred to as "line cards"). Generally, they control the sending and receiving of data packets over the network and sometimes support other peripherals used with the router 510. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5*b* is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 565) configured to store data, program instructions for the general-purpose network operations and/or other operations described herein. The program instructions may control the operation of an operating system and/or one or more applications, for example. The memory or memories may also be configured to store addresses, timer limits, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

b. Peering and Keep-Alive Mechanisms

In an HSRP group, the primary and standby RG members transmit hellos while other RG members (if any) remain idle. Similar keep-alive practices are implemented in the present invention (the timing of the messages can be structured in a manner similar to the HSRP system as discussed in more detail in RFC 2281 and the '599 patent).

As seen in FIG. 6, each RG member 510 sends hello packets 540 for its VMAC Group. In the preferred embodiment of the invention, hellos use the VMAC addresses as source addresses. Hello packets 540 transmitted from the VMAC Group let other RG members 510 learn of the participating RG member and its associated VMAC address which is used to bind hosts 520 to the RG member for default gateway services. In FIG. 6, the primary member of RG 508 is member 510a. As with HSRP, hello packets are addressed to an "ALL_ROUTERS" multicast address (for example, the commonly used all routers destination address (DA) 0100.5E00.0002, as seen in FIG. 6), announcing the member's presence in the group. Note that the Master assigns the VMAC addresses to be used by non-Master routers.

The source MAC address of these multicast hello packets is the VMAC address of the particular group if the transmitting RG member is the primary of the group (akin to standard HSRP practice). In FIG. 6, for example, each RG member 510 must be able to recognize hello packets 540, 545 with a destination address (DA) 0100.5E00.0002 and a source MAC address (SA) of 0000.0C07.ACxx (where 'xx' represents a masking of all possible VMAC Groups). This is the MAC address space used by HSRP. Of course, any placeholder MAC address will work and the HSRP address space need not be used. In the implementation of FIG. 6, each RG member 510 will be aware of the presence of every other RG member 510 and its associated VMAC address used in the load balancing process. The mechanisms of this embodiment can utilize timers and a timing scheme similar to HSRP.

Initial hellos configure the peering arrangement between the RG group members. Hellos also help to elect the master of the load balancing service group. However, upon receiving a valid hello from an RG member's VMAC Group, all other RG members will create a state for the discovered RG member and its associated VMAC address. As described in further detail below, the master adjusts the load balancing procedure to include a newly discovered RG member. In the preferred embodiment, host relationships are not moved to another RG member when a new member appears. However, the gateway assignments can be adjusted so that when a host re-ARPs for the default gateway, it may be directed to a new RG member.

c. Conditional ARP Response Mechanism

Once a load balancing scheme is established using multiple RG members in accordance with the present invention, members can begin sharing responsibility for default gateway services to the hosts within a local subnet. The distribution function used to assign hosts to gateways determines the host load-sharing effectiveness. As discussed above, a master is elected from within the Group. The elected master is the only member of the RG which responds to host ARP requests for a gateway address, in this case, the shared gateway VIP address.

As illustrated by the example in FIG. 7, upon receiving an ARP request 701 for the VIP address 516 from a host 520b, the master RG member 510a responds 702 with one of several VMAC addresses based on its knowledge of other members 510b-d of RG 508. Responding with one of the VMAC addresses binds the requesting host 520b to one of the RG members for default gateway services. In the example shown in FIG. 7, VMAC address 0000.0007.AC02, the VMAC address 518b of member 510b, is sent to host 520b. Host 520b then populates its gateway ARP cache 703 with the VMAC address 518b sent by the master. As long as the host's gateway ARP cache holds this VMAC address, the host 520b will send its outgoing traffic 704 to the assigned gateway.

Depending on the system and the needs of the hosts, various load-sharing algorithms can be implemented to divide the hosts 520 on the LAN or subnet 530 among the participating RG members 510 for default gateway services. A simple or weighted round-robin method can be used in which each successive host 520 is assigned to the next RG member in a sequence. A second method involves hashing the source MAC address of the host to generate the ARP response. The hash yields one of the available default gateways out of all eligible RG members. The distribution function can be implemented so that a hash is performed on the source MAC address of the ARP request itself, yielding one of N answers (where N is the number of active RG members). As will be appreciated, the load balancing function under this distribution algorithm is as effective as the randomness of the source MAC addresses of the ARP requests. In another embodiment of the present invention, the load balancing allocation function can take into account weighting of the responses to direct a specific percentage of the hosts to specific RG members, for example based on uplink interface states.

d. Fail-Over Mechanism

Failure of an RG member is detected by listening to the keep-alives generated by the RG members in their respective VMAC Groups. If a particular RG member (master or slave) is not heard from for a specific amount of time, the RG member is then determined to be down and appropriate action is taken. In the context of the present invention, therefore, two different failure scenarios are considered and addressed.

i. Slave Failure

FIG. 8a illustrates schematically what happens when a slave RG member 510c fails in the preferred embodiment of the present invention. In the example presented in FIG. 8a, RG member 510c originally has VMAC address 518c (0000.0007.AC03). VMAC address 518c originally was used by RG member 510c. When member 510c fails 801 in the preferred embodiment (that is, when the member fails to broadcast keep-alive hellos in a timely fashion), the current master RG member 510a assumes 802 the load sharing responsibilities of the failed member 510c. The master 510a does this by assuming the VMAC address 518c of the failed slave RG member 510c (in addition to the master's own VMAC address and PMAC address), after which all hosts originally homed to the failed member 510c (for example, host 520b in FIG. 8a which has VMAC address 0000.0007.AC03 in its ARP cache) seamlessly and transparently forward 803 default gateway traffic to the master 510a.

Two possible failures of a slave member are considered—the slave may be temporarily down, or the slave member may have been permanently removed. To accommodate various failure conditions and scenarios in the present invention, two additional, different timers are used in this embodiment of the present invention, as shown in FIG. 8b.

Checks 842 are performed periodically to determine whether slave hellos are received during the specified time $T_H$. If the hello from a slave is received, then the system remains in its normal condition 840. However, when a slave fails to send a hello in timely manner, as seen at 844 in FIG.

8b, the master assumes the VMAC address of the slave member due to failure of the slave, and at 846 starts an algorithm inclusion timer (AIT). (Actually, because any surviving RG member might become the master, all of the RG members start the MT; the acting master is the only RG member that is responsive to the AIT's status, however.)

The AIT allows the failed member's VMAC address to remain included in the load balancing distribution algorithm of the master for a defined period of time. This timer thus provides for the possibility that the slave failure may only be temporary and that a portion of new connections (that is, responses to ARPs from hosts) under the load balancing distribution algorithm should still be directed to the failed member's VMAC address which is then being tended by the master. Therefore, a check 848 is performed to see if the slave member is still failed. If not, then the master relinquishes the VMAC address to the resumed slave at 850 and the members stop the AIT timer at 852, after which the system returns to its normal condition 840.

If the slave member is still failed, then another check 854 is performed to determine whether the time $T_{AIT}$ has reached the threshold limit. If the limit has not been reached, then the counter is incremented at 856 and the master continues at 858 to assign clients to the failed slave's VMAC address. If the AIT expires before the failed slave member resumes service, the master then at 860 stops sending the failed slave's VMAC address in response to ARP inquiries as part of the distribution algorithm. At the same time, the master and all other RG members start an algorithm removal timer, the ART timer.

While tending another RG member's VMAC address, it does not matter which VMAC address the master RG member uses as the source MAC address when responding to hosts. Hosts do not rebuild their ARP cache when a frame arrives from a known IP address having a different MAC address. The only time a host will notice a different source MAC address is if the host previously using the failed default gateway re-ARPs for its default gateway. In this case, the host would receive a response with a new VMAC address associated with a remaining RG member. If the failed slave RG member resumes operation and forms a peer relationship with the remaining RG members, the master RG member will stop responding to the resumed RG member's VMAC address. Although the resumed RG member will have to re-ARP for its hosts' MAC addresses, this will not disrupt the present load balancing distribution state.

If the slave has been permanently removed from service, it eventually must be removed altogether from any remaining RG member's state table since it is not to be used for load balancing and gateway services. Therefore, a check 862 is made to determine whether the slave member is still failed. If the slave has resumed service, then at 864 the resumed slave builds peering relationships and state tables and at 866 the other RG members stop their ART timers. At 850 the master relinquishes the VMAC address to the resumed slave and at 852 the members stop the AIT timers, if they are still counting.

The ART determines when it is safe for all remaining active RG members to totally remove any reference to the failed RG member's VMAC address. The ART must be set to be longer than the AIT and must ensure that no remaining hosts will point to the failed RG member's VMAC address after expiration of the ART. A safe minimum timer value for the ART is 4 hours. If the slave is still failed at 862, then a check 868 is made to determine whether the ART limit has been reached. If not, the ART timer $T_{ART}$ is incremented at 870 and the master continues responding to the clients sending the failed slave's VMAC address at 872. The check 862 is again performed.

If the limit for the ART timer is reached, then at 874 the master stops responding to clients' using the failed slave's VMAC address and all clients erase the state table entry for the failed slave's VMAC address. As noted above, if a failed RG member resumes service after expiration of the AIT, but before expiration of the ART, the members will retain the resumed member's VMAC address in their caches, but the resumed member will have to begin anew in assignments of hosts to the newly resumed member in the distribution algorithm. However, as will be apparent to one of ordinary skill in the art, any appropriate process for re-integrating resuming members may be used.

ii. Master Failure

FIG. 9a illustrates schematically the second fail-over scenario when the master RG member fails. Upon failure 901 of the master RG member 510a, the slave RG member with the second highest priority in the Group (RG member 510b in the example illustrated in FIG. 9) will become 902 the new master. Any other active slave RG members 510c, 510d start their ART timers for the failed master's VMAC address 518a and continue normal operation. The new master 510b must assume 904 the failed master's VMAC address 518a (in FIG. 9a, the failed master's VMAC address is 0000.0007.AC01) to ensure that the failed master's hosts (for example, host 520a) are not disrupted. Additionally, the new master RG member will begin its ATT and ART for the failed master to ensure the load balancing algorithm properly handles the member failure. Finally, the new master 510b will begin to respond to ARP requests from new hosts on the shared gateway IP address 516 and will perform all the normal functions of a master RG member.

As seen in FIG. 9b, checks 942 are performed periodically to determine whether master's hellos are received during the specified time $T_H$. If the hello from the master is received, then the system remains in its normal condition 940. However, when the master fails to send a hello in timely manner, as seen at 944 in FIG. 9b, the remaining member with the highest priority assumes the VMAC address of the master and begins to function as master due to failure of the predecessor master. The newly elected master checks at 943 to determine whether the new master is the only active gateway (that is, RG member). If it is, then at 945 the new master sends a gratuitous broadcast ARP with its VMAC address to all clients.

Whether or not the new master is the only RG member remaining active, the new master (and any remaining members) at 946 start the algorithm inclusion timer (AIT). (Again, because any surviving RG member might become the master, all of the RG members start the AIT; the acting master is the only RG member that is responsive to the AIT's status.)

The AIT allows the failed master's VMAC address to remain included in the load balancing distribution algorithm of the new master for a defined period of time. This timer thus provides for the possibility that the former master failure may only be temporary and that a portion of new connections (that is, responses to ARPs from hosts) under the load balancing distribution algorithm should still be directed to the failed master's VMAC address which is then being tended by the new master. Therefore, a check 948 is performed to see if the former master is still failed. If not, then the new master relinquishes the VMAC address to the resumed member as a new slave at 950 and the members stop the AIT timer at 952, after which the system returns to its normal condition 940.

If the former master is still failed, then another check 954 is performed to determine whether the time $T_{AIT}$ has reached the threshold limit. If the limit has not been reached, then the counter is incremented at 956 and the new master continues at 958 to assign clients to the failed master's VMAC address. If the AIT expires before the failed former master resumes service, the new master then at 960 stops sending the failed master's VMAC address in response to ARP inquiries as part of the distribution algorithm. At the same time, the new master and all other remaining RG members start an algorithm removal timer, the ART timer.

As noted above, while tending another RG member's VMAC address, it does not matter which VMAC address the new master RG member uses as the source MAC address when responding to hosts. Hosts do not rebuild their ARP cache when a frame arrives from a known IP address having a different MAC address. The only time a host will notice a different source MAC address is if the host previously using the failed default gateway re-ARPs for its default gateway. In this case, the host would receive a response with a new VMAC address associated with a remaining RG member. If the failed master RG member resumes operation and forms a peer relationship with the remaining RG members, the new master will stop responding to the resumed master RG member's VMAC address. Although the resumed former master, which re-enters the group as a slave, will have to re-ARP for its hosts' MAC addresses, this will not disrupt the present load balancing distribution state.

If the former master has been permanently removed from service, it eventually must be removed altogether from any remaining RG member's state table since it is not to be used for load balancing and gateway services. Therefore, a check 962 is made to determine whether the former master is still failed. If the former master has resumed service as a slave, then at 964 the resumed member builds peering relationships as a slave and state tables and at 966 the other RG members stop the ART timers. At 950 the new master relinquishes the VMAC address to the new slave and at 952 the members stop the AIT timers, if they are still counting.

As noted above, the ART determines when it is safe for all remaining active RG members to totally remove any reference to the failed RG member's VMAC address. The ART must be set to be longer than the AIT and must ensure that no remaining hosts will point to the failed RG member's VMAC address after expiration of the ART. A safe minimum timer value for the ART is 4 hours. If the former master is still failed at 962, then a check 968 is made to determine whether the ART limit has been reached. If not, the ART timer $T_{ART}$ is incremented at 970 and the new master continues responding to the clients sending the failed master's VMAC address at 972. The check 962 is again performed.

If the limit for the ART timer is reached, then at 974 the new master stops responding to clients' using the failed master's VMAC address and all clients erase the state table entry for the failed master's VMAC address.

iii. RG Member Resumption Mechanism

As discussed briefly above, a failed RG member that resumes service can be re-inserted into the load balancing service. This RG member may be considered a new member (if it is, in fact, new or if it suffered what the system considers permanent failure) or a recovered member, if the failure was only temporary. Two possible scenarios exist for the insertion of the new or recovered member.

The first scenario involves a member resuming service within the AIT measured by the master (actually, the AIT is run by all RG members since any one of them might become master; it is only the master RG member that acts on the expiration of the AIT). In this scenario, the master has continued sending out the failed RG member's VMAC address to new hosts in a load balancing manner. As the new member comes up and announces itself through its VMAC Group hellos, the master will relinquish the resumed member's VMAC address and the resumed member will re-assume its duties as a slave RG member and addressee device for those hosts for which the resumed member serves as the gateway device. In addition, all active RG members will terminate their ART timers as the failed member is now back in service.

The second scenario involves a member who is considered a new member or is being re-inserted after the ART timers have expired and the active RG members no longer have prior knowledge of the newly inserted member. In this case, the new member announces itself through its VMAC Group hellos and the other active RG members add the new member and its associated VMAC address to their state tables. In addition, the master adds the new VMAC into the load balancing algorithm.

In the preferred embodiment of the present invention, the master will never relinquish its status as master to a newly inserted member, regardless of the newly inserted member's configured priority. Such action could cause problems if the newly inserted member has not yet learned the state of the other RG members before becoming the master. For this reason, no HSRP-type preempt function is used when running the preferred load balancing embodiment of the present invention. The newly inserted member will not become the master unless the current master fails.

One particular failure/recovery case warrants special attention. The case involves multiple failures where the master fails first and the newly elected master subsequently fails and resumes service having lost the state of the newly acquired VMAC address from the original master RG member. In this scenario, hosts addressing packets to the original master could be stranded without a gateway to use. Two possible outcomes exist for this scenario. First, if there are more than two RG members, this is a non-issue as there would be a third slave RG member to assume the master role after the second elected master failed. Because no preempt function is present, there is no threat that a resumed former master would assert itself as the new master.

The troublesome outcome exists when only two RG members exist in the group and the first master fails, subsequently the second master fails, and then either of the masters resumes service. In this scenario, the resumed master, regardless of which RG member resumes service, will have no "knowledge" of the other RG member's former existence. This could lead to the possible stranding of hosts for default gateway services.

To address this case, a gratuitous-ARP mechanism is used. This is the only place where gratuitous-ARP is used in the preferred embodiment of the present invention. If a newly resumed RG member finds itself master, it knows that it is the only active RG member in the gateway load balancing service. This is guaranteed because no preempt function is enabled. As a result, the only way this new member could become master is if it is the only member. The member election happens in the Group and follows normal election procedures. Since the newly resumed RG member is the only existing RG member, it also must be the sole gateway on the local network, thereby making it the master. Therefore, regardless of the address to which hosts are sending gateway traffic from a MAC address perspective (ARP cache), this newly resumed member is the only way out of the LAN or subnet. For that reason, the newly resumed and elected member will generate a gratuitous-ARP message listing its own VMAC address to ensure that all hosts utilize the newly resumed RG member it for default gateway services. This will ensure no hosts are left stranded unable to reach a default gateway.

While one embodiment of a gateway load balancing system has been described, it should be appreciated that other systems, methods and apparatus can implement and/or use the present invention without departing from the spirit or the scope of the present invention.

What is claimed is:

1. A method implemented on a gateway device to provide load balancing gateway services to hosts on a network segment, the method comprising:
   receiving at the gateway device an address resolution protocol (ARP) message from a host addressed to an address shared by a plurality of gateway devices available for serving the hosts on the network segment;
   in response to the received ARP message, and based at least in part on load balancing considerations, the gateway device selecting one of the plurality of gateway devices to act as the addressee gateway device for the host, when the gateway device is acting as a master gateway device for the plurality of gateway devices; and
   the gateway device replying to the ARP message with a reply message identifying the selected addressee gateway device, when the gateway device is acting as a master gateway device for the plurality of gateway devices,
   wherein, when the gateway device is acting as a master gateway device for the plurality of gateway devices, the gateway device replies to every ARP message sent to the address shared by the plurality of gateway devices, and selects a gateway device in response to each of such ARP messages.

2. The method of claim 1 wherein the gateway devices are layer 3 devices.

3. The method of claim 1 wherein the address shared by the plurality of gateway devices is a virtual IP address.

4. The method of claim 1 wherein the reply message identifies a layer 2 address for the addressee gateway device.

5. The method of claim 4 wherein the layer 2 address for the addressee gateway device is a virtual (secondary) MAC address.

6. The method of claim 1 further comprising the steps of:
   determining that one of the plurality of gateway devices has failed; and
   compensating for the failed gateway device by taking over acting as the addressee gateway device for any hosts for which the failed gateway device had been serving as the addressee gateway device.

7. The method of claim 1 further comprising the step of determining that the failed gateway device has failed permanently and redistributing addressee gateway device responsibility to other available gateway devices in the plurality of gateway devices for any hosts for which the failed gateway device had been serving as the addressee gateway device.

8. A method, implemented on a single gateway device, providing gateway services to hosts on a network segment, the method comprising:
   receiving at the gateway device an ARP message from a host;
   in response to the received ARP message, and based at least in part on load balancing considerations, the gateway device selecting a gateway device, from among a group of available gateway devices available for servicing hosts on the network segment, to act as the addressee gateway device for the host that sent the ARP message, when the gateway device is acting as a master gateway device for the plurality of gateway devices;
   the gateway device replying to the ARP message with a reply message identifying the addressee gateway device, when the gateway device is acting as a master gateway device for the plurality of gateway devices,
   wherein, when the gateway device is acting as a master gateway device for the plurality of gateway devices, the gateway device replies to every ARP message sent to the address shared by the plurality of gateway devices, and selects a gateway device in response to each of such ARP messages;
   determining that one of the other available gateway devices has failed; and
   taking over responsibility for gateway services of the failed gateway device.

9. The method of claim 8 wherein the gateway device on which the method is implemented is a layer 3 device.

10. A non-transitory computer-readable medium containing programmed instructions arranged to be implemented on a gateway device to provide load balancing gateway services to hosts on a network segment, the computer-readable medium including programmed instructions for:
    receiving at the gateway device an ARP message from a host addressed to an address shared by a plurality of gateway devices available for serving the hosts on the network segment;
    in response to the received ARP message, and based at least in part on load balancing considerations, the gateway device selecting one of the plurality of gateway devices to act as the addressee gateway device for the host, when the gateway device is acting as a master gateway device for the plurality of gateway devices; and
    the gateway device replying to the ARP message with a reply message identifying the selected addressee gateway device, when the gateway device is acting as a master gateway device for the plurality of gateway devices,
    wherein, when the gateway device is acting as a master gateway device for the plurality of gateway devices, the gateway device replies to every ARP message sent to the address shared by the plurality of gateway devices, and selects a gateway device in response to each of such ARP messages.

11. The non-transitory computer-readable medium of claim 10 wherein the gateway devices are layer 3 devices.

12. The non-transitory computer-readable medium of claim 10 wherein the address shared by the plurality of gateway devices is a virtual IP address.

13. The non-transitory computer-readable medium of claim 10 wherein the reply message identifies a layer 2 address for the addressee gateway device.

14. The non-transitory computer-readable medium of claim 13 wherein the layer 2 address for the addressee gateway device is a virtual (secondary) MAC address.

15. The non-transitory computer-readable medium of claim 10 further comprising programmed instructions for:
    determining that one of the plurality of gateway devices has failed; and
    compensating for the failed gateway device by taking over acting as the addressee gateway device for any hosts for which the failed gateway device had been serving as the addressee gateway device.

16. The non-transitory computer-readable medium of claim 10 further comprising programmed instructions for determining that the failed gateway device has failed permanently and redistributing addressee gateway device responsibility to other available gateway devices in the plurality of gateway devices for any hosts for which the failed gateway device had been serving as the addressee gateway device.

17. A non-transitory computer-readable medium containing programmed instructions arranged to be implemented on a gateway device to provide load balancing gateway services to hosts on a network segment, a non-transitory computer-readable medium including programmed instructions for:
  receiving at the gateway device an ARP message from a host;
  in response to the received ARP message, and based at least in part on load balancing considerations, the gateway device selecting a gateway device, from among the group of available gateway devices, to act as the addressee gateway device for the host that sent the ARP message, when the gateway device is acting as a master gateway device for the plurality of gateway devices;
  the gateway device replying to the ARP message with a reply message identifying the addressee gateway device, when the gateway device is acting as a master gateway device for the plurality of gateway devices,
  wherein, when the gateway device is acting as a master gateway device for the plurality of gateway devices, the gateway device replies to every ARP message sent to the address shared by the plurality of gateway devices, and selects a gateway device in response to each of such ARP messages;
  determining that one of the available gateway devices has failed; and
  taking over responsibility for gateway services of the failed gateway device.

18. The non-transitory computer-readable medium of claim 17 wherein the gateway device on which the method is implemented is a layer 3 device.

19. A master gateway device for use in a gateway load balancing service comprising the master gateway device and one or more slave gateway devices, the master gateway device comprising:
  a memory configured to hold:
    a shared address shared by the master gateway device and the one or more slave gateway devices;
    a plurality of unique addresses comprising:
      a unique address for the master gateway device; and
      a unique address for each of the one or more slave gateway devices;
  a network interface configured to send and receive network traffic including an ARP message from a host addressed to the shared address;
  a processor configured to:
    select, in response to the received ARP message, and based at least in part on load balancing considerations, one of the master and slave gateway devices to act as the addressee gateway device for the host; and
    reply to the ARP message with a reply message identifying the selected addressee gateway device,
  wherein the processor is further configured to reply to every ARP message sent to the address shared by the plurality of gateway devices, and select a gateway device in response to each of such ARP messages.

20. The device of claim 19 wherein the master and slave gateway devices are layer 3 devices.

21. The device of claim 19 wherein the address shared by the master and slave gateway devices is a virtual IP address.

22. The device of claim 19 wherein the reply message identifies a layer 2 address for the addressee gateway device.

23. The device of claim 22 wherein the layer 2 address for the addressee gateway device is a virtual (secondary) MAC address.

24. The device of claim 19 wherein the processor is further configured to:
  detect the failure of one of the gateway devices; and
  reconfigure the master gateway device to take over acting as the addressee gateway device for any hosts for which the failed gateway device had been serving as the addressee gateway device.

25. The device of claim 19 wherein the processor is further configured to:
  detect whether the failed gateway device has failed permanently; and
  if the failed gateway device has failed completely, to redistribute addressee gateway device responsibility to other available gateway devices in the plurality of gateway devices for any hosts for which the failed gateway device had been serving as the addressee gateway device.

26. A gateway apparatus to provide load balancing gateway services to hosts on a network segment, the apparatus comprising:
  means for receiving an ARP message from a host addressed to an address shared by a plurality of gateway devices available for serving the hosts on the network segment the gateway apparatus being one of the plurality of gateway devices;
  means for selecting, in response to the received ARP message, and based at least in part on load balancing considerations, one of the plurality of gateway devices to act as the addressee gateway device for the host, when the gateway apparatus is acting as a master gateway device for the plurality of gateway devices; and
  means for replying to the ARP message with a reply message identifying the selected addressee gateway device, when the gateway apparatus is acting as a master gateway device for the plurality of gateway devices,
  wherein the gateway apparatus is configured to reply to every ARP message sent to the address shared by the plurality of gateway devices, and select a gateway device in response to each of such ARP messages, when the gateway apparatus is acting as a master gateway device for the plurality of gateway devices.

27. The apparatus of claim 26 wherein the gateway devices are layer 3 devices.

28. The apparatus of claim 26 wherein the address shared by the plurality of gateway devices is a virtual IP address.

29. The apparatus of claim 26 wherein the reply message identifies a layer 2 address for the addressee gateway device.

30. The apparatus of claim 29 wherein the layer 2 address for the addressee gateway device is a virtual (secondary) MAC address.

31. The apparatus of claim 26 further comprising:
  means for determining that one of the plurality of gateway devices has failed; and
  means for compensating for the failed gateway device by taking over acting as the addressee gateway device for any hosts for which the failed gateway device had been serving as the addressee gateway device.

32. The apparatus of claim 26 further comprising means for determining that the failed gateway device has failed permanently and means for redistributing addressee gateway device responsibility to other available gateway devices in the plurality of gateway devices for any hosts for which the failed gateway device had been serving as the addressee gateway device.

33. A gateway apparatus providing gateway services to hosts on a network segment, the apparatus comprising:

means for receiving an ARP message from a host;

means for, at the gateway apparatus, selecting, in response to the received ARP message, and based at least in part on load balancing considerations, a gateway device, from among a group of available gateway devices available for servicing hosts on the network segment, to act as the addressee gateway device for the host that sent the ARP message, when the gateway apparatus is acting as a master gateway device for the plurality of gateway devices;

means for replying, to the ARP message with a reply message identifying the addressee gateway device, when the gateway apparatus is acting as a master gateway device for the plurality of gateway devices;

means for determining that one of the available gateway devices has failed; and means for taking over responsibility for gateway services of the failed gateway device, wherein the gateway apparatus is configured to reply to every ARP message sent to the address shared by the plurality of gateway devices, and select a gateway device in response to each of such ARP messages, when the gateway apparatus is acting as a master gateway device for the plurality of gateway devices.

34. The apparatus of claim 33 wherein the gateway apparatus is a layer 3 device.

35. A network segment comprising:

a plurality of gateway devices sharing an address, including a master gateway device, the master gateway device elected from among the plurality of gateway devices;

a host configured to send an ARP message to the shared address of the plurality of gateway devices;

wherein the master gateway device is configured to respond to the ARP message by selecting, based at least in part on load balancing considerations, one of the plurality of gateway devices to act as the addressee gateway device for the host; and sending the host a reply message identifying the selected addressee gateway device wherein no gateway devices other than the master gateway device selects one of the plurality of gateway devices to act as the addressee gateway device for the host, or replies to the ARP message with a reply message identifying the selected addressee gateway device.

36. The network segment of claim 35 wherein the plurality of gateway devices is configured to assume responsibility for any addressee gateway device that fails.

37. A network segment comprising:

a host having means for addressing messages to a layer 3 addressee device;

a layer 3 device group including a plurality of layer 3 devices; and means for distributing packets from the host to the devices in the device group, the distributing means comprising:

means for electing one of the devices a master device, the electing means comprising:

means for determining a priority status of each device in the device group, wherein the master device is elected on the basis of its priority status and includes:

means for assigning a device in the device group as the addressee device for packets from the host, wherein no device other than the device elected to be the master device assigns a device in the device group as the addressee device for packets from a host;

fail-over means comprising:

slave failure means for accommodating failure of one of the devices that is not the master device in the device group, wherein the slave failure means comprises:

means for re-distributing packets destined for a failed device to a functioning device in the device group;

master failure means for accommodating failure of the master device, wherein the master failure means comprises:

means for appointing a successor master device from among the functioning devices in the device group;

means for assigning the successor master device as the addressee device for packets from the host destined for the failed master.

38. A network device comprising:

a network interface; and a processor designed or configured to perform the following operations:

receiving an ARP message from a host addressed to an address shared by a plurality of gateway devices available for serving the hosts on the network segment, the network device being one of the plurality of gateway devices;

in response to the received ARP message, and based at least in part on load balancing considerations, selecting one of the plurality of gateway devices to act as the addressee gateway device for the host, when the network device is acting as a master gateway device for the plurality of gateway devices; and replying to the ARP message with a reply message identifying the selected addressee gateway device, when the network device is acting as a master gateway device for the plurality of gateway devices, wherein the network device is configured to reply to every ARP message sent to the address shared by the plurality of gateway devices, and select a gateway device in response to each of such ARP messages, when the network device is acting as a master gateway device for the plurality of gateway devices.

39. The network device of claim 38, wherein the network device is a layer 3 device.

40. The network device of claim 38 wherein the address shared by the plurality of gateway devices is a virtual IP address.

41. The network device of claim 38 wherein the reply message identifies a layer 2 address for the addressee gateway device.

42. The network device of claim 41 wherein the layer 2 address for the addressee gateway device is a virtual (secondary) MAC address.

43. The network device of claim 38, wherein the processor is further designed or configured to perform the following operations:

determining that one of the plurality of gateway devices has failed; and compensating for the failed gateway device by taking over acting as the addressee gateway device for any hosts for which the failed gateway device had been serving as the addressee gateway device.

44. The network device of claim 38, wherein the processor is further designed or configured to perform the following operation:

determining that the failed gateway device has failed permanently and redistributing addressee gateway device responsibility to other available gateway devices in the plurality of gateway devices for any hosts for which the failed gateway device had been serving as the addressee gateway device.

\* \* \* \* \*